US011991450B2

(12) United States Patent
Nakao

(10) Patent No.: US 11,991,450 B2
(45) Date of Patent: May 21, 2024

(54) COMPOSITION CONTROL DEVICE, COMPOSITION CONTROL METHOD, AND PROGRAM

(71) Applicant: Sony Group Corporation, Tokyo (JP)

(72) Inventor: Yuta Nakao, Tokyo (JP)

(73) Assignee: Sony Group Corporation, Tokyo (JP)

( * ) Notice: Subject to any disclaimer, the term of this patent is extended or adjusted under 35 U.S.C. 154(b) by 239 days.

(21) Appl. No.: 17/608,840

(22) PCT Filed: Apr. 1, 2020

(86) PCT No.: PCT/JP2020/015058
§ 371 (c)(1),
(2) Date: Nov. 4, 2021

(87) PCT Pub. No.: WO2020/241038
PCT Pub. Date: Dec. 3, 2020

(65) Prior Publication Data
US 2022/0311941 A1 Sep. 29, 2022

(30) Foreign Application Priority Data
May 27, 2019 (JP) ................................ 2019-098556

(51) Int. Cl.
*H04N 23/695* (2023.01)
*H04N 23/60* (2023.01)
(Continued)

(52) U.S. Cl.
CPC ......... *H04N 23/695* (2023.01); *H04N 23/611* (2023.01); *H04N 23/631* (2023.01); *H04N 23/64* (2023.01)

(58) Field of Classification Search
None
See application file for complete search history.

(56) References Cited

U.S. PATENT DOCUMENTS 9,261,957 B2 * 2/2016 Kim ........................ G06F 3/012
11,006,048 B2 * 5/2021 Yun ........................ H04N 23/90
(Continued)

FOREIGN PATENT DOCUMENTS

JP 2009-218807 A 9/2009
JP 2009-244369 A 10/2009
(Continued)

OTHER PUBLICATIONS

International Search Report dated Jun. 30, 2020 in PCT/JP2020/015058 filed on Apr. 1, 2020, 3 pages.

*Primary Examiner* — Stefan Gadomski
(74) *Attorney, Agent, or Firm* — Oblon, McClelland, Maier & Neustadt, L.L.P.

(57) ABSTRACT

Operability is improved for an operation related to composition adjustment.

Composition designation operation information is acquired that is operation information designating a composition of an imaging device and includes information of a designated position on a screen that displays a captured image of the imaging device, and an imaging range of the imaging device is controlled to adjust the composition of the imaging device on the basis of subject information corresponding to the designated position of the composition designation operation information. Thus, the adjustment to the target composition is performed on the basis of the subject information corresponding to the designated position on the screen displaying the captured image.

20 Claims, 25 Drawing Sheets

A 1
52
54a
55
54
51
50
53

B

D2
52
54a
54
55
51
50
53
D1

(51) Int. Cl.
*H04N 23/611* (2023.01)
*H04N 23/63* (2023.01)

(56) References Cited

U.S. PATENT DOCUMENTS

2011/0007187 A1 1/2011 Mori et al.
2011/0157394 A1* 6/2011 Yoshizumi ............. H04N 23/50 348/222.1
2011/0298888 A1* 12/2011 Shimada .............. H04N 23/698 348/37
2011/0300910 A1* 12/2011 Choi ..................... G06F 3/0485 455/566
2012/0002075 A1* 1/2012 Yoshizumi ............. H04N 23/50 348/E5.037
2013/0278778 A1 10/2013 Kagei
2013/0314547 A1 11/2013 Watanabe
2014/0362274 A1* 12/2014 Christie ............... H04N 23/632 715/763
2015/0138192 A1* 5/2015 Marchenko ......... G06F 3/04815 345/419
2015/0350556 A1* 12/2015 Lee ........................ H04N 23/69 348/143
2016/0336041 A1 11/2016 Mukai et al.
2017/0155832 A1* 6/2017 Oshima ................ H04N 23/611
2017/0195536 A1* 7/2017 Sakai ..................... H04N 23/90
2017/0347025 A1* 11/2017 Park ....................... H04N 23/60
2018/0017659 A1 1/2018 Irie
2019/0114740 A1 4/2019 Ogino et al.
2019/0163242 A1* 5/2019 Zeng ....................... G06F 1/188
2019/0349515 A1* 11/2019 Shimosato ........... H04N 23/611

FOREIGN PATENT DOCUMENTS

JP 2013-223220 A 10/2013
JP 2013-247508 A 12/2013
JP 2016-27704 A 2/2016
JP 2017-199982 A 11/2017
WO WO 2016/151925 A1 9/2016

* cited by examiner

FIG. 1
A
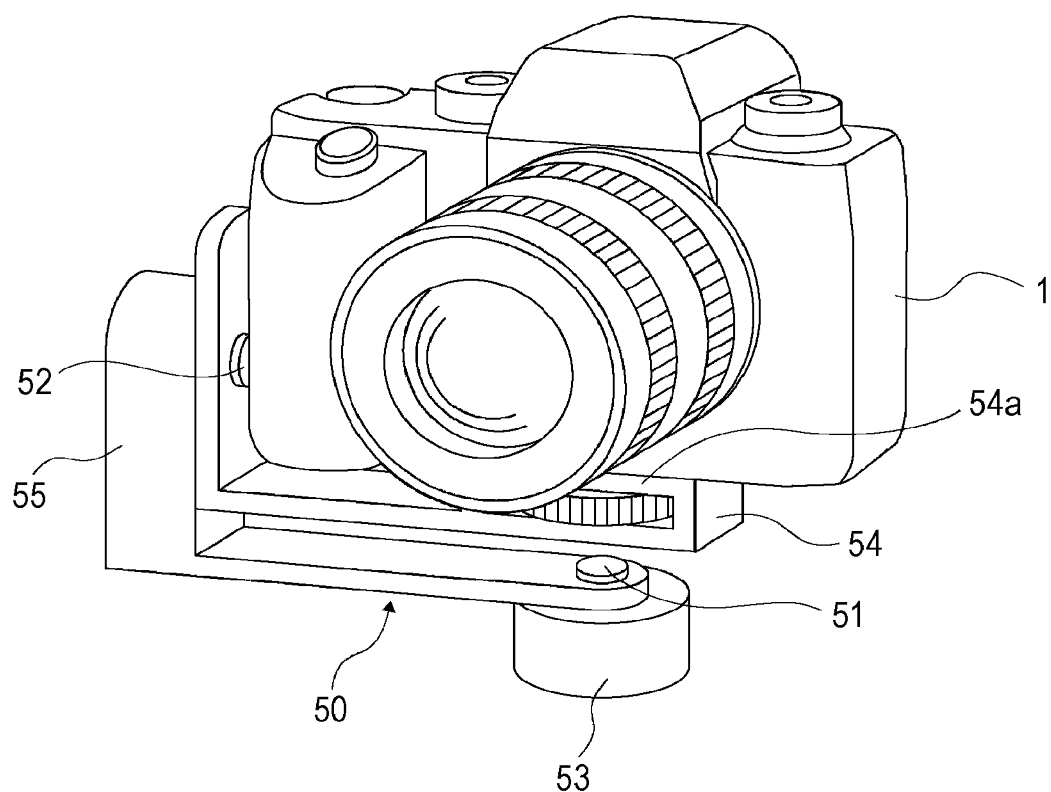
B
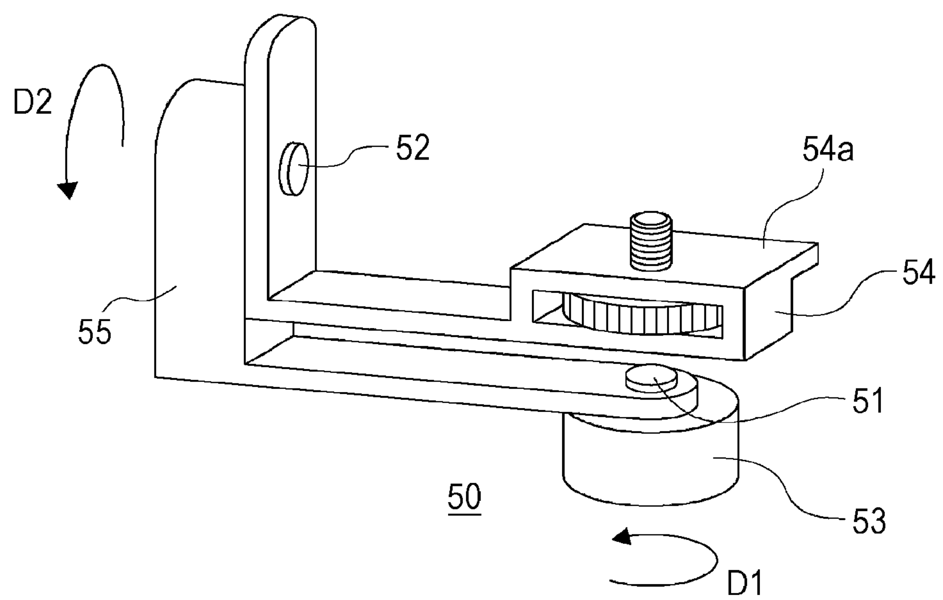

LENS SYSTEM
2
DRIVER UNIT
7
IMAGING UNIT
3
CAMERA SIGNAL PROCESSING UNIT
4
IMAGE RECOGNITION PROCESSING UNIT
5
RECORDING CONTROL UNIT
6
12
COMMUNICATION UNIT
11
DISPLAY UNIT
10
OPERATION UNIT
TOUCH PANEL
9a
9
CONTROL UNIT
8
1

FIG. 6
A
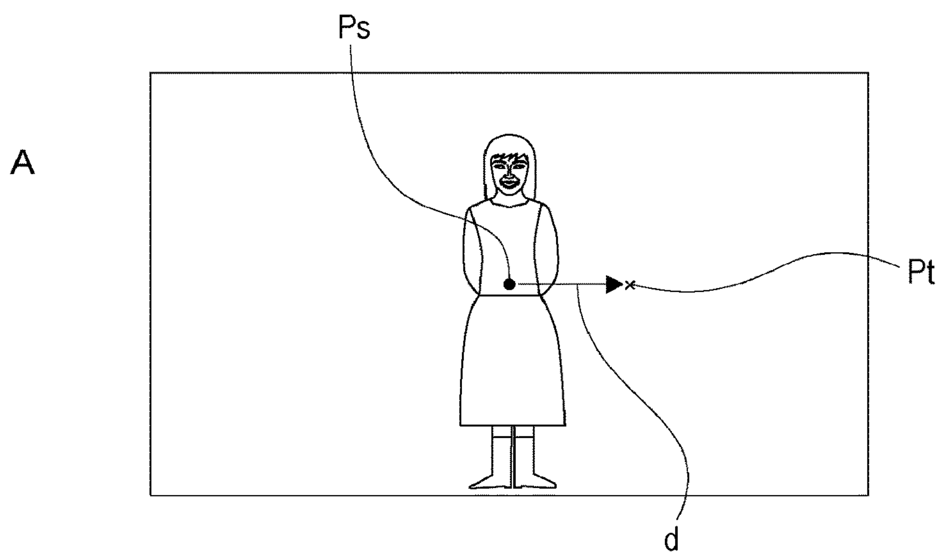
B
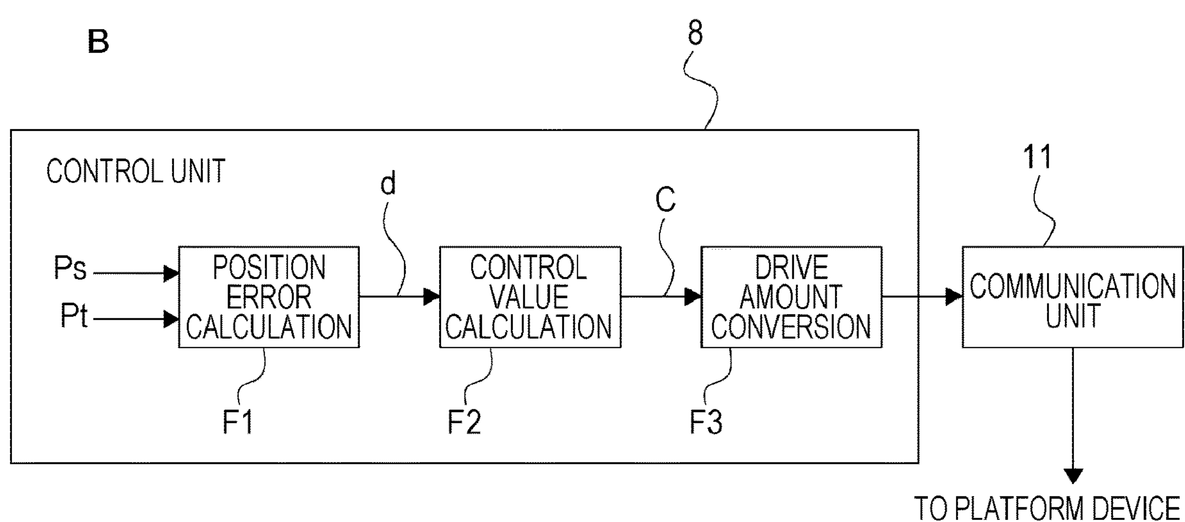

FIG. 18
A
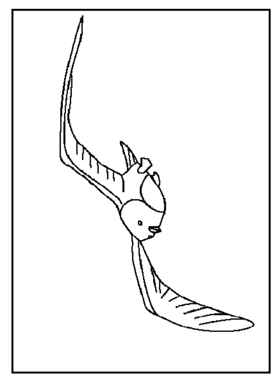
B
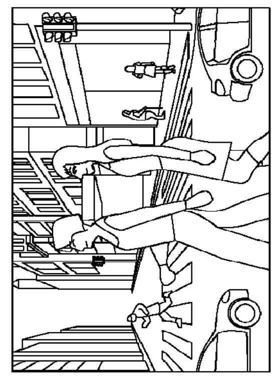
C
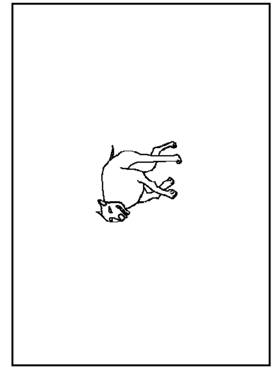

FIG. 22
A
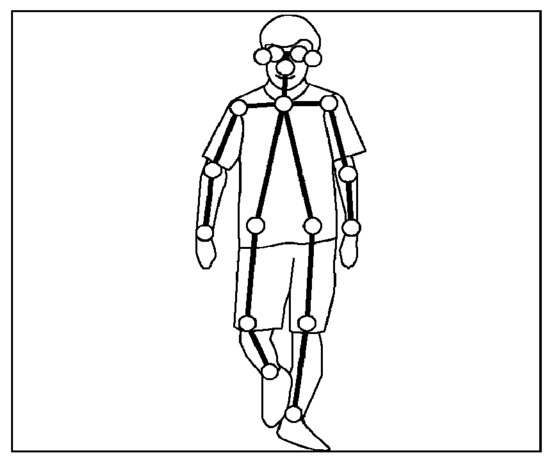
B
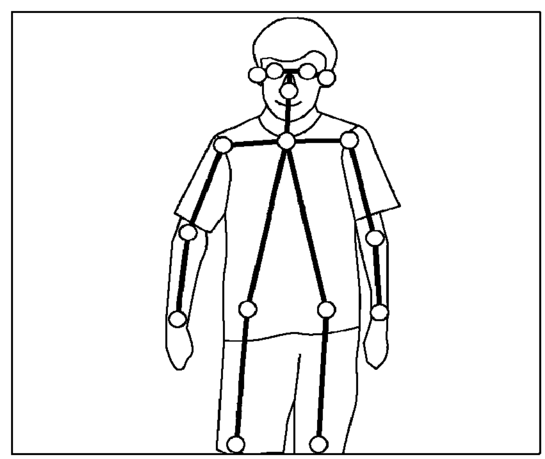
C
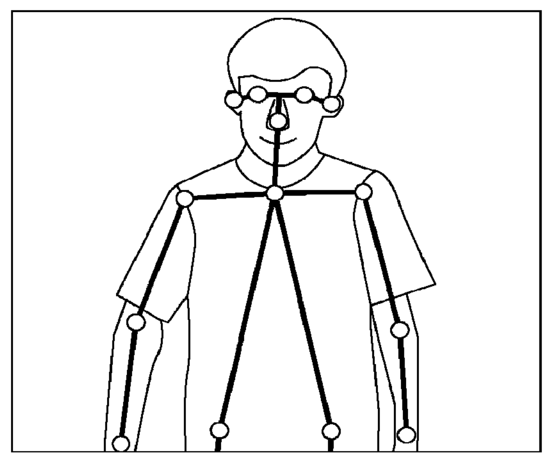

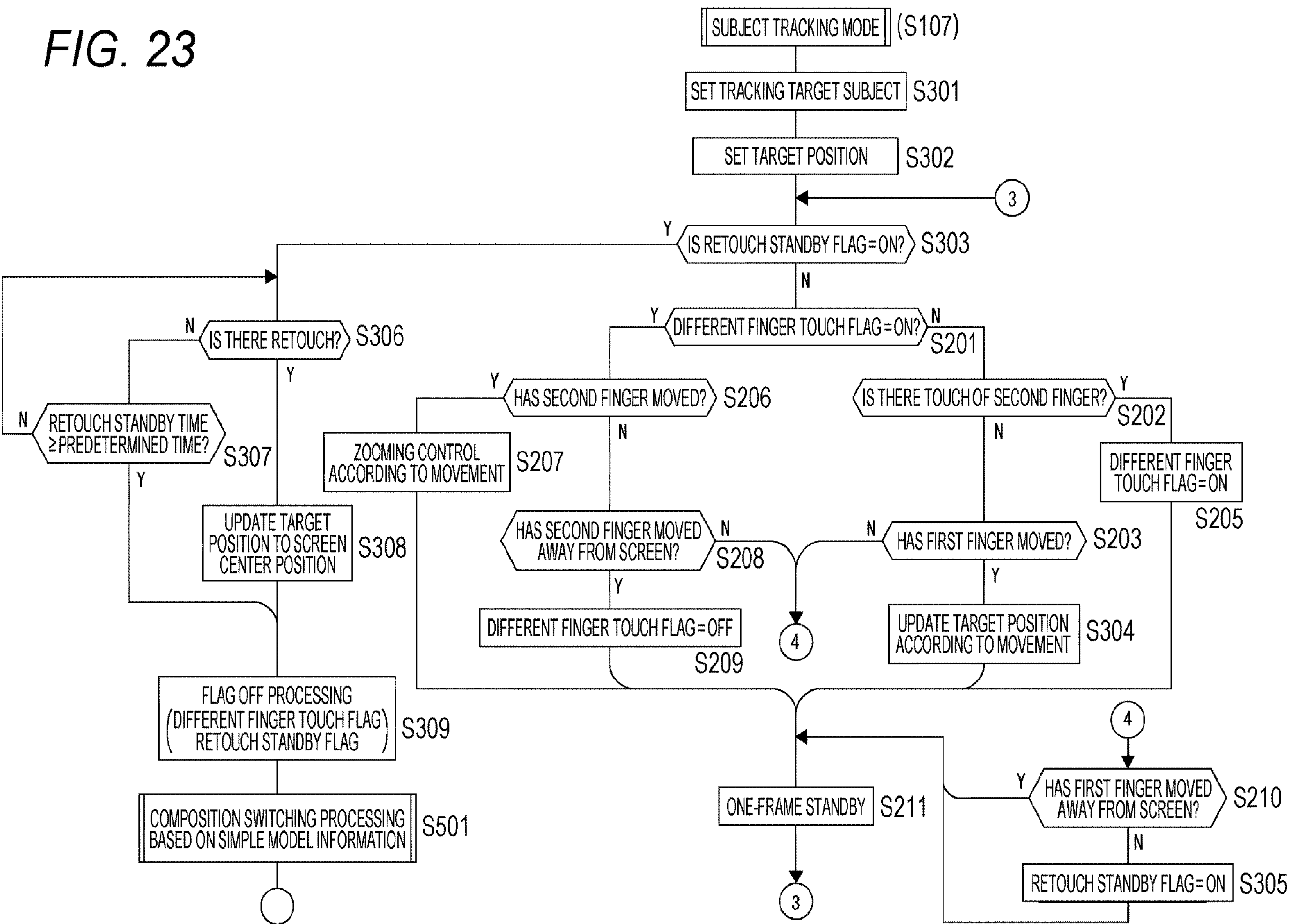
FIG. 23
SUBJECT TRACKING MODE
(S107)
SET TRACKING TARGET SUBJECT
S301
SET TARGET POSITION
S302
3
IS RETOUCH STANDBY FLAG=ON?
S303
Y
N
DIFFERENT FINGER TOUCH FLAG=ON?
S201
Y
N
HAS SECOND FINGER MOVED?
S206
Y
N
ZOOMING CONTROL ACCORDING TO MOVEMENT
S207
HAS SECOND FINGER MOVED AWAY FROM SCREEN?
S208
Y
N
DIFFERENT FINGER TOUCH FLAG=OFF
S209
IS THERE TOUCH OF SECOND FINGER?
S202
Y
N
DIFFERENT FINGER TOUCH FLAG=ON
S205
HAS FIRST FINGER MOVED?
S203
Y
N
UPDATE TARGET POSITION ACCORDING TO MOVEMENT
S304
4
IS THERE RETOUCH?
S306
Y
N
RETOUCH STANDBY TIME ≥PREDETERMINED TIME?
S307
Y
N
UPDATE TARGET POSITION TO SCREEN CENTER POSITION
S308
FLAG OFF PROCESSING (DIFFERENT FINGER TOUCH FLAG RETOUCH STANDBY FLAG)
S309
COMPOSITION SWITCHING PROCESSING BASED ON SIMPLE MODEL INFORMATION
S501
ONE-FRAME STANDBY
S211
3
4
HAS FIRST FINGER MOVED AWAY FROM SCREEN?
S210
Y
N
RETOUCH STANDBY FLAG=ON
S305

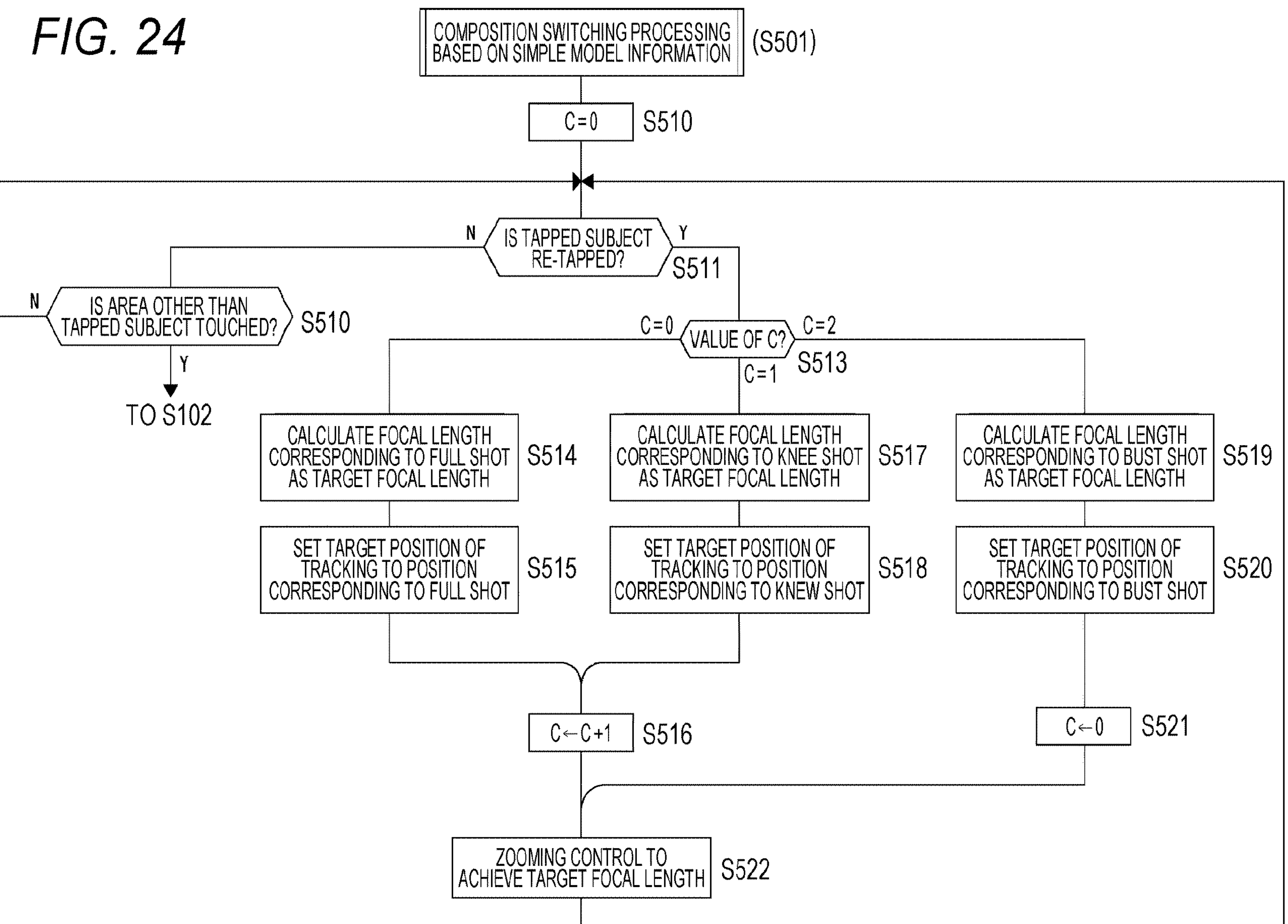
FIG. 24
COMPOSITION SWITCHING PROCESSING BASED ON SIMPLE MODEL INFORMATION
(S501)
C=0
S510
IS TAPPED SUBJECT RE-TAPPED?
S511
N
Y
IS AREA OTHER THAN TAPPED SUBJECT TOUCHED?
S510
N
Y
TO S102
VALUE OF C?
S513
C=0
C=1
C=2
CALCULATE FOCAL LENGTH CORRESPONDING TO FULL SHOT AS TARGET FOCAL LENGTH
S514
SET TARGET POSITION OF TRACKING TO POSITION CORRESPONDING TO FULL SHOT
S515
CALCULATE FOCAL LENGTH CORRESPONDING TO KNEE SHOT AS TARGET FOCAL LENGTH
S517
SET TARGET POSITION OF TRACKING TO POSITION CORRESPONDING TO KNEW SHOT
S518
CALCULATE FOCAL LENGTH CORRESPONDING TO BUST SHOT AS TARGET FOCAL LENGTH
S519
SET TARGET POSITION OF TRACKING TO POSITION CORRESPONDING TO BUST SHOT
S520
C←C+1
S516
C←0
S521
ZOOMING CONTROL TO ACHIEVE TARGET FOCAL LENGTH
S522

1A
LENS SYSTEM
2
IMAGING UNIT
3
CAMERA SIGNAL PROCESSING UNIT
4
RECORDING CONTROL UNIT
6
12
DRIVER UNIT
7
CONTROL UNIT
8
OPERATION UNIT
TOUCH PANEL
9
9a
DISPLAY UNIT
10
COMMUNICATION UNIT
11
30
LENS SYSTEM
2
IMAGING UNIT
3
CAMERA SIGNAL PROCESSING UNIT
4
IMAGE RECOGNITION PROCESSING UNIT
5

COMPOSITION CONTROL DEVICE, COMPOSITION CONTROL METHOD, AND PROGRAM

TECHNICAL FIELD

The present technology relates to a composition control device, a composition control method, and a program, and particularly relates to a technology related to reception of operation in designating a target composition.

BACKGROUND ART

For example, a platform device capable of driving an imaging device so as to change an imaging direction, such as an electric gimbal, is known. Then, the subject tracking can be performed using this type of platform device. Specifically, control of the platform device (drive control of an actuator built in the platform device) is performed such that a target subject is positioned at a predetermined position such as a center position in a captured image.

Patent Document 1 below discloses a subject tracking technique using the platform device. Specifically, in Patent Document 1, first, the user is caused to execute an operation of panning and tilting the platform device, so as to arrange a subject to be tracked at a desired position in the screen. That is, adjustment to a target composition at the time of tracking is performed on the basis of the pan and tilt operation of the user. Then, when the operation button 10 is operated by the user after the composition is adjusted in this way, the tracking operation of the target subject is started so that the adjusted composition is maintained.

Furthermore, in Patent Document 1, the composition adjusted by the pan and tilt operation as described above can be registered as the target composition at the time of tracking. Information of the registered composition (specifically, information of center coordinates Mp and a size Ft of the tracking target frame for the tracking subject S) is associated with a shot button 16, and when the shot button 16 is operated, the tracking operation of the subject is started so as to maintain the registered composition.

CITATION LIST

Patent Document

Patent Document 1: Japanese Patent Application Laid-Open No. 2013-247508

SUMMARY OF THE INVENTION

Problems to be Solved by the Invention

In the technique described in Patent Document 1 above, since the adjustment to the target composition is performed on the basis of the pan and tilt operation of the platform device by the user, it is difficult to adjust the composition to an intended composition in a situation where the subject moves. Furthermore, even in a case where the composition is switched to the pre-registered composition using the shot button 16, there is no difference in that the composition is adjusted in advance by panning and tilting operations, and an operation for adjustment to the target composition is difficult.

The present technology has been made in view of the circumstances described above, and has an object to improve operability of an operation related to composition adjustment.

Solutions to Problems

A composition control device according to the present technology includes a control unit configured to acquire composition designation operation information that is operation information designating a composition of an imaging device and includes information of a designated position on a screen that displays a captured image of the imaging device, and control an imaging range of the imaging device to adjust the composition of the imaging device on the basis of subject information corresponding to the designated position of the composition designation operation information.

The composition designation operation information includes information of the designated position on the screen on which the captured image is displayed. Thus, adjustment to a target composition is performed on the basis of an intuitive operation of designating a position on the screen for displaying the captured image. Specifically, in the configuration described above, the composition of the imaging device is adjusted on the basis of the subject information corresponding to the designated position on the screen. The subject information is information regarding a subject in the captured image, and is at least information indicating the presence or absence of the detected subject. Thus, the composition is adjusted on the basis of an intuitive operation such as an operation of designating the position of the detected subject on the screen.

The composition control device according to the present technology described above can be configured such that in a case where the subject information indicates a detected subject detected from the captured image, the control unit controls the imaging range in such a manner as to track the detected subject.

Thus, an operation of designating the subject to be tracked is an operation of designating the detected subject in the screen.

The composition control device according to the present technology described above can be configured such that in a case where the subject information does not indicate the detected subject, the control unit does not perform control for tracking the subject at the designated position.

Thus, for example, in a case where a subject estimated as not desired by the user to be tracked, such as a background portion of the detected subject, is designated, tracking of the subject at the designated position is not performed.

The composition control device according to the present technology described above can be configured such that the composition designation operation information includes direction designation operation information based on a direction designation operation that designates a direction in a plane of the screen, and the control unit controls the imaging range on the basis of the direction designation operation information.

With this direction designation operation, it is possible to designate a direction related to the composition adjustment such as a direction of changing a position of the subject designated by an operation of designating a position in the screen.

The composition control device according to the present technology described above can be configured such that the composition designation operation information is detected by a touch operation on the screen, and the designated position is a touch start position of the screen.

Thus, an operation of designating the subject to be tracked can be a simple operation of touching the subject on the screen.

The composition control device according to the present technology described above can be configured such that the direction designation operation information is detected by an operation of tracing the screen.

Thus, the operation of designating a direction related to the composition adjustment can be achieved by an intuitive operation of sliding a finger in a direction in which the composition is desired to be changed on the screen.

The composition control device according to the present technology described above can be configured such that the control unit controls the imaging range by controlling a platform device to which the imaging device is attached.

Thus, it is possible to adjust the composition by changing the imaging direction of the imaging device by the platform device.

The composition control device according to the present technology described above can be configured such that the platform device is capable of adjusting a direction of the imaging device in a pan or tilt direction, and the composition designation operation information designating the pan or tilt direction is detected by an operation of linearly tracing the screen.

Thus, the operation of designating the pan or tilt direction is achieved by an intuitive operation of linearly sliding the finger along the pan or tilt direction.

The composition control device according to the present technology described above can be configured such that the platform device is capable of adjusting a direction of the imaging device in a roll direction, and the composition designation operation information designating the roll direction is an operation of tracing the screen in an arc shape.

Thus, an operation of designating the roll direction is achieved by an intuitive operation of sliding the finger in an arc shape along the roll direction.

The composition control device according to the present technology described above can be configured such that the control unit controls the imaging range by controlling a platform device to which the imaging device is attached, and controls the platform device to change a direction of the imaging device in a direction opposite to the direction designated by the direction designation operation in a case where the subject information indicates a detected subject detected from the captured image, and to change the direction of the imaging device in the direction designated by the direction designation operation in a case where the subject information does not indicate the detected subject.

In a case where a position designation operation is an operation of designating the position of the detected subject, it can be estimated that the user desires to change the position of the detected subject in the screen by a subsequent direction designation operation, and thus the direction of the imaging device is changed in the direction opposite to the direction designated by the direction designation operation. On the other hand, in a case where the position designation operation is an operation of designating a position other than the detected subject, it can be estimated that the user directly designates a changing direction of the imaging direction by the subsequent direction designation operation, and thus the direction of the imaging device is changed in the direction designated by the direction designation operation.

The composition control device according to the present technology described above can be configured such that the control unit controls the imaging range by controlling a platform device to which the imaging device is attached, and controls, in a case where the subject information indicates the detected subject, the platform device using a parameter corresponding to a type of the detected subject as a parameter related to the tracking.

Thus, it is possible to perform tracking control by a parameter corresponding to the designated subject, such as performing tracking control by a parameter with increased followability in a case where the designated subject is a type of subject that moves quickly and performing tracking control by a parameter with decreased followability in a case where the designated subject is a type of subject that moves slowly.

The composition control device according to the present technology described above can be configured such that the platform device is capable of adjusting directions of the imaging device in a pan direction and a tilt direction, and the control unit uses the parameter corresponding to the type of the detected subject for each of control in the pan direction and control in the tilt direction of the platform device.

Thus, tracking characteristics in the pan direction and the tilt direction can be individually set according to the type of the designated subject. It is possible that, for example, in a case where the subject is a bird, tracking responsiveness is increased in both the pan and tilt directions, and in a case where the subject is a dog, the tracking responsiveness in the pan direction is enhanced but the tracking responsiveness in the tilt direction is lowered.

The composition control device according to the present technology described above can be configured such that the control unit performs tracking control in one of a first tracking mode in which the parameter having high tracking responsiveness in the pan direction and the tilt direction is used, a second tracking mode in which the parameter having low tracking responsiveness in the pan direction and the tilt direction is used, and a third tracking mode in which the parameter having low tracking responsiveness in one of the pan direction and the tilt direction and having high tracking responsiveness in the other of the pan direction and the tilt direction according to the type of the detected subject.

Thus, it is possible to prevent tracking in which responsiveness is excessively enhanced in a direction in which it is not necessary to enhance the tracking responsiveness according to the type of the designated subject.

The composition control device according to the present technology described above can be configured such that the control unit adjusts, after control of the platform device using the parameter corresponding to the type of the detected subject is started, the parameter on the basis of an error between a position of the detected subject and a target position of tracking.

It is possible to determine whether or not the set parameter is suitable for actual movement of the subject according to the magnitude of the error between a designated position of the subject and the target position of tracking.

The composition control device according to the present technology described above can be configured such that the control unit controls, in a case where the subject information indicates a detected subject detected as a person in the screen, the imaging range on the basis of simplified model information of a human body detected for the detected subject.

The simplified model information of the human body is information indicating an arrangement state of a plurality of parts constituting the human body such as eyes, ears, a nose, a mouth, a neck, shoulders, elbows, wrists, buttocks, knees, and ankles in the human body. With the above configuration, the control of the imaging range for changing the composition can be performed not on the basis of the operation of directly giving an instruction on the driving direction or the drive amount of the camera platform or the focal length adjustment operation, but on the basis of a position and posture of each part of the subject, for example, estimated from the simplified model information described above.

The composition control device according to the present technology described above can be configured such that the control unit controls the imaging range in such a manner that a center of an angle of view is located on a front direction side of the detected subject on the basis of information of a direction of the detected subject estimated from the simplified model information.

Thus, it is possible to adjust the composition to a natural composition in which a space is secured on a front side of the designated subject.

The composition control device according to the present technology described above can be configured such that the composition designation operation information is detected by a touch operation on the screen, the designated position is a touch start position of the screen, and the control unit controls the imaging range based on the simplified model information on the basis of an operation on the screen after detection of the designated position.

Thus, the composition adjustment based on the simplified model information, such as adjustment to a composition in which the entire body of the subject appears or a composition in which only a half body appears for example, can be achieved by a simple operation of designating a target subject by a touch operation on the screen and then performing an operation on the screen.

The composition control device according to the present technology described above can be configured such that the control unit controls the imaging range on the basis of a result of image recognition processing performed on a captured image by an imaging device separate from the imaging device in which a captured image is displayed on the screen.

Thus, as a captured image used for the image recognition processing, a captured image with camera settings suitable for the image recognition processing can be used instead of the captured image with camera settings according to a drawing intention of the user.

Furthermore, a composition control method according to the present technology is a composition control method including acquiring composition designation operation information that is operation information designating a composition of an imaging device and includes information of a designated position on a screen that displays a captured image of the imaging device, and controlling an imaging range of the imaging device to adjust the composition of the imaging device on the basis of subject information corresponding to the designated position of the composition designation operation information.

Even with such a composition control method, a similar operation to that of the composition control device according to the present technology described above can be obtained.

Furthermore, a program according to the present technology is a program causing an information processing device to achieve a function including acquiring composition designation operation information that is operation information designating a composition of an imaging device and includes information of a designated position on a screen that displays a captured image of the imaging device, and controlling an imaging range of the imaging device to adjust the composition of the imaging device on the basis of subject information corresponding to the designated position of the composition designation operation information.

With such a program, the composition control device according to the present technology described above is achieved.

BRIEF DESCRIPTION OF DRAWINGS

FIG. 1 is an explanatory view of an external appearance configuration example of an imaging system including a composition control device as a first embodiment according to the present technology.

FIG. 6 is a diagram for explaining subject tracking control processing in the embodiment.

FIG. 18 is a diagram for explaining an example of a type of a subject as a target in the parameter setting processing.

FIG. 22 is a diagram illustrating an example of a captured image corresponding to each composition illustrated in FIG. 21.

FIG. 23 is a flowchart illustrating an example of a specific processing procedure for achieving a composition adjustment method as a first example in a third embodiment.

FIG. 24 is a flowchart illustrating processing content of step S501 illustrated in FIG. 23.

MODE FOR CARRYING OUT THE INVENTION

Figure 2:
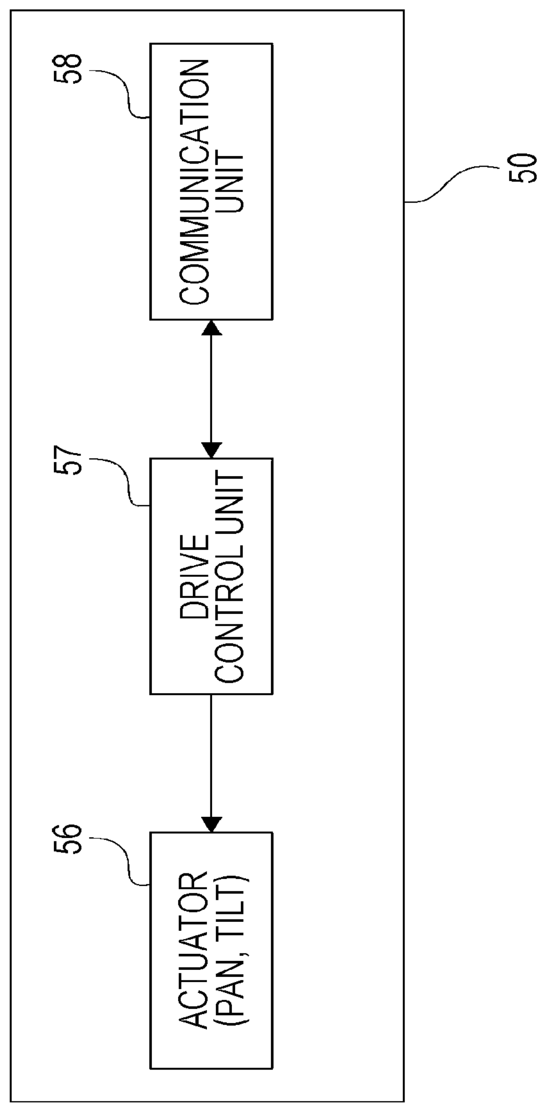
FIG. 2 is a block diagram illustrating an internal configuration example of a platform device in the embodiment.

Hereinafter, embodiments will be described in the following order.

1. First Embodiment
[1-1. Device configuration example]
[1-2. Composition adjustment]
[1-3. Processing procedure]
2. Second Embodiment
3. Third Embodiment
[3-1. First example]
[3-2. Second example]
<4. Modification examples>
<5. Summary of embodiment>
<6. Present technology>

1. First Embodiment

1-1. Device Configuration Example

FIG. 1 is an explanatory view of an external appearance configuration example of an imaging system including a composition control device (imaging device 1) as a first embodiment according to the present technology.

The imaging system according to the present embodiment includes an imaging device 1 and a platform device 50. In the imaging system, an imaging direction of the imaging device 1 is changed by a rotation operation of the platform device 50 in a state where the imaging device 1 is mounted on the platform device 50. In particular, the platform device 50 includes an actuator as described later, and automatic tracking is performed on a subject to be tracked by driving and controlling the actuator.

Note that the "imaging direction" is a direction corresponding to a direction in which the imaging device 1 performs imaging, and refers to a front direction (direction indicating a subject side) in an optical axis line of an imaging optical system included in the imaging device 1. In a case of the system as in FIG. 1, the imaging direction is changed by the rotation angle of the platform device 50, and thus the imaging direction is uniquely determined by a rotation angle of the platform device 50.

FIG. 1A illustrates a state in which the imaging device 1 is mounted (attached) on the platform device 50, and FIG. 1B illustrates only the platform device 50.

The platform device 50 is provided with a rotation shaft part 51 for rotation in a pan direction (in other words, a yaw direction) indicated by an arrow D1 in the drawing and a rotation shaft part 52 for rotation in a tilt direction (in other words, a pitch direction) indicated by an arrow D2, and is provided with a base part 53, an attachment part 54, and an arm part 55.

The attachment part 54 is, for example, an L-shaped member, and a joint mechanism 54*a* corresponding to a mechanism that is not illustrated and formed on a bottom portion of the imaging device 1 is provided on a top surface of the bottom portion, by which the imaging device 1 can be fixed as illustrated in FIG. 1A.

The attachment part 54 is attached to the arm part 55 via the rotation shaft part 52, so that the attachment part 54 is rotatable in the tilt direction with respect to the arm part 55.

The arm part 55 is, for example, an L-shaped member, and is attached to the base part 53 on the rotation shaft part 51 side. Thus, the arm part 55 (and the attachment part 54 connected to the arm part 55) is rotatable in the pan direction.

For example, by using such a platform device 50, the imaging direction of the imaging device 1 can be displaced in the pan direction and the tilt direction. Thus, it is possible to change the composition of the captured image by the imaging device 1.

Here, changing the imaging direction of the imaging device 1 by the platform device 50 is a kind of changing the imaging range of the imaging device 1.

In the imaging system illustrated in FIG. 1A, for example, it is assumed that a handle part that is not illustrated is mounted on the base part 53 of the platform device 50, and a user as an imaging person holds the handle part in a hand to use the handle part. Alternatively, it is also assumed that the base part 53 is mounted on a pedestal such as a tripod and the user uses the platform device 50 without holding the platform device in the hand.

FIG. 2 is a block diagram illustrating an internal configuration example of the platform device 50.

The platform device 50 includes an actuator 56, a drive control unit 57, and a communication unit 58.

In this example, the actuator 56 is provided with a panning direction actuator (for example, a motor) that rotationally drives the rotation shaft part 51 and a tilting direction actuator (for example, a motor) that rotationally drives the rotation shaft part 52.

The drive control unit 57 includes a drive circuit of the actuator 56, a control circuit that controls the drive circuit, and the like, and performs drive control of the actuator 56. In particular, the drive control unit 57 of this example performs drive control of the actuator 56 in accordance with information input via the communication unit 58.

The communication unit 58 performs data communication with an external device according to a predetermined communication format. In particular, the communication unit 58 of this example performs data communication according to a communication format corresponding to a communication unit 11, which will be described later, included in the imaging device 1.

Figure 3:
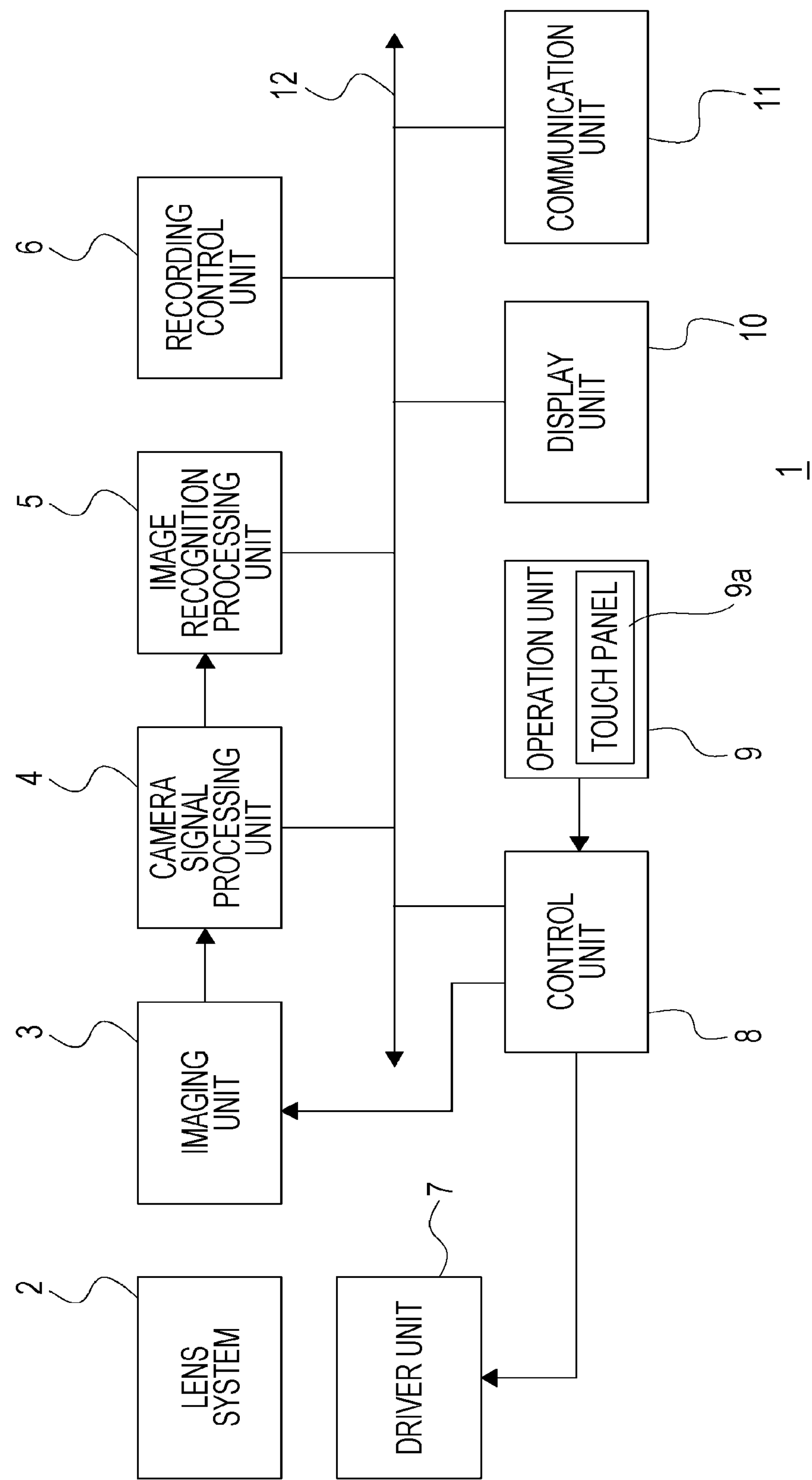
FIG. 3 is a block diagram illustrating an internal configuration example of the composition control device as the first embodiment.

FIG. 3 is a block diagram illustrating an internal configuration example of the imaging device 1.

The imaging device 1 is configured as a digital camera device, and can image a subject, record image data as a moving image or a still image on a recording medium, or transmit the image data to an external device.

As illustrated, the imaging device 1 includes a lens system 2, an imaging unit 3, a camera signal processing unit 4, an image recognition processing unit 5, a recording control unit 6, a driver unit 7, a control unit 8, an operation unit 9, a display unit 10, a communication unit 11, and a bus 12. The camera signal processing unit 4, the image recognition processing unit 5, the recording control unit 6, the control unit 8, the display unit 10, and the communication unit 11 are connected to the bus 12, and these units can perform data communication with each other via the bus 12.

The lens system 2 includes lenses such as a cover lens, a zoom lens, and a focus lens, a diaphragm mechanism, and the like. Light (incident light) from a subject is guided by the lens system 2 and condensed on an imaging surface of an imaging element in the imaging unit 3.

The imaging unit 3 includes, for example, an imaging element such as a complementary metal oxide semiconductor (CMOS) type or a charge coupled device (CCD) type.

The imaging unit 3 performs, for example, correlated double sampling (CDS) processing, automatic gain control (AGC) processing, and the like on an electric signal obtained by photoelectrically converting light received by the imaging element, and further performs analog/digital (A/D) conversion processing. Then, the captured image signal as digital data is output to the camera signal processing unit 4 in the subsequent stage.

The camera signal processing unit 4 is configured as an image processing processor by, for example, a digital signal processor (DSP) or the like. The camera signal processing unit 4 performs various types of signal processing on a digital signal (captured image signal) from the imaging unit 3. For example, preprocessing, synchronization processing, YC generation processing, resolution conversion processing, and the like are performed.

The image recognition processing unit 5 performs image analysis on the captured image signal input via the camera signal processing unit 4, and performs recognition processing of image contents. In particular, in the case of the present embodiment, the image recognition processing unit 5 performs detection of a subject, detection of a face, and processing of recognizing the type of a detected subject in the frame of the captured image signal. Examples of the type of the subject recognized in the processing of recognizing the subject include a person, an animal (dog, cat, bird, and the like), an automobile, an airplane, and a train.

In this example, the image recognition processing unit 5 specifies a “position” and a “range” of the subject in processing of detecting the subject. Here, as the “position” of the subject, an attention position of the subject is specified. Here, the attention position means a position to be noted determined for a target subject, and for example, in a case of a subject as a person, the position of interest can include a center (a center in vertical and horizontal directions) or the center of gravity in the entire body, the center of the face, and the like. Alternatively, in a case where the subject is a train or an automobile, a leading end portion in the traveling direction, a driver’s seat position, and the like can be exemplified.

In this example, the position of interest is determined in advance according to the type of the subject, and the image recognition processing unit 5 specifies the attention position of the subject according to the type of the subject.

Note that it is also conceivable to determine the attention position in advance for each type of the subject according to a user operation.

The image recognition processing unit 5 outputs information related to the subject (hereinafter referred to as “subject information Is”) detected in the subject detection processing to the control unit 8 in response to a request from the control unit 8. Specifically, in a case where a subject is detected, the image recognition processing unit 5 outputs information indicating a position (subject position Ps as described later) and a range of the subject as the subject information Is. Furthermore, in a case where the type of the detected subject is recognized, the image recognition processing unit 5 outputs information indicating the type together with the information of the position and range of the subject as the subject information Is.

The recording control unit 6 performs recording and reproduction on a recording medium by, for example, a nonvolatile memory. The recording control unit 6 performs processing of recording an image file MF such as moving image data or still image data, a thumbnail image, or the like on a recording medium, for example.

Various actual forms of the recording control unit 6 can be considered. For example, the recording control unit 6 may be configured as a flash memory built in the imaging device 1 and a write-read circuit thereof, or may be in the form of a card recording-reproducing unit that performs recording-reproducing access to a recording medium that can be attached to and detached from the imaging device 1, for example, a memory card (portable flash memory or the like). Furthermore, it may be implemented as a hard disk drive (HDD) or the like as a form built in the imaging device 1.

The driver unit 7 is provided with a driver or the like corresponding to each motor for driving each of the zoom lens, the focus lens, and the diaphragm mechanism in the lens system 2.

These drivers supply a drive current to a corresponding motor in response to an instruction from the control unit 8, and cause movement of the focus lens and the zoom lens, opening and closing of the diaphragm blade of the diaphragm mechanism, and the like to be executed.

The control unit 8 includes a microcomputer (arithmetic processing unit) including a central processing unit (CPU), a read only memory (ROM), a random access memory (RAM), and the like. The RAM described above is used for temporary storage of data, programs, and the like as a work area at the time of various data processing of the CPU. The ROM is used for storing an operating system (OS) for the CPU to control each unit, content files such as image files, application programs for various operations, firmware, and the like.

The control unit 8 performs overall control of the imaging device 1 by executing a program stored in the above-described ROM or the like. For example, the control unit 8 controls operation of each necessary unit with respect to control of shutter speed of the imaging unit 3, instruction of various signal processing in the camera signal processing unit 4, imaging operation and recording operation according to an operation of the user using the operation unit 9, reproduction operation of the recorded image file, operation of the lens system 2 such as zooming, focusing, and diaphragm adjustment, user interface operation, and the like.

Furthermore, the control unit 8 executes a program stored in the above-described ROM or the like to issue an instruction to the platform device 50 via the communication unit 11, so as to control the pan/tilt operation of the platform device 50. That is, the adjustment operation of the imaging direction in the pan and tilt directions is controlled.

Moreover, the control unit 8 of this example controls the platform device 50 for tracking the target subject on the basis of detection information of the subject by the image recognition processing unit 5.

Here, "tracking" means that the position of the target subject continues to coincide with a predetermined target position in the captured image.

Note that a specific example of control for subject tracking performed by the control unit 8 will be described later.

The operation unit 9 collectively indicates input devices for the user to perform various operation inputs. Examples of control elements included in the operation unit 9 can include control elements such as various buttons, dials, and/or the like provided in the housing of the imaging device 1. Furthermore, the operation unit 9 is provided with a touch panel 9*a* that detects a touch operation on the screen of the display unit 10.

The operation unit 9 detects an operation by the user and outputs a signal according to the detected operation to the control unit 8.

The display unit 10 displays various types of information to the user as the imaging person. The display unit 10 is, for example, a display device such as a liquid crystal display (LCD) or an organic electro-luminescence (EL) display arranged in a housing of the imaging device 1.

The display unit 10 displays various types of information on the screen on the basis of an instruction from the control unit 8. For example, the display unit 10 displays a reproduced image of the image data read from the recording medium in the recording control unit 6.

Furthermore, the image data of the captured image whose resolution has been converted for display by the camera signal processing unit 4 is supplied to the display unit 10, and the display unit 10 displays the image data of the captured image in response to an instruction from the control unit 8. Thus, what is called a through image (monitoring image of the subject), which is a captured image during composition confirmation, is displayed on the screen.

Furthermore, the display unit 10 displays various operation menus, icons, messages, and the like as a graphical user interface (GUI) on the screen on the basis of an instruction from the control unit 8.

Hereinafter, the display screen of the display unit 10 is referred to as a "screen 10*a*".

The communication unit 11 performs data communication with an external device according to a predetermined communication format. In particular, the communication unit 11 of this example can perform data communication with the communication unit 58 in the platform device 50. Here, the data communication between the communication unit 58 and the communication unit 11 in the platform device 50 may be, for example, wired communication such as USB or wireless communication such as Bluetooth (registered trademark).

1-2. Composition Adjustment

Hereinafter, a composition adjustment method as an embodiment will be described with reference to FIGS. 4 to 12.

First, in the present embodiment, a target composition is designated by an operation on the screen 10*a* that displays a captured image of the imaging device 1 whose composition is adjusted by the platform device 50. Specifically, the imaging device 1 of the present embodiment receives an operation of designating a position on the screen 10*a* that displays a captured image as a designation operation of a target composition, and controls the platform device 50 to adjust the composition to the target composition. More specifically, in this example, the operation of designating the position on the screen 10*a* as described above is received as an operation of designating a composition. That is, in this case, designation operation information of the composition (composition designation operation information) acquired from the operation of designating the composition includes information of the designated position on the screen 10*a*. Then, in the composition adjustment method of this example, the composition of the imaging device is adjusted on the basis of the subject information corresponding to the designated position by such composition designation operation information. The subject information is information regarding the subject in the captured image, and includes at least information indicating presence or absence of the detected subject. By performing composition adjustment based on such subject information, it is possible to perform composition adjustment according to at least the presence or absence of the detected subject.

Here, in this example, the target composition means a target composition when tracking the subject. That is, the composition here includes at least an element with respect to which position in the captured image the subject to be tracked is to be arranged at.

A specific composition adjustment method will be described with reference to FIGS. 4 and 5.

Figure 4:
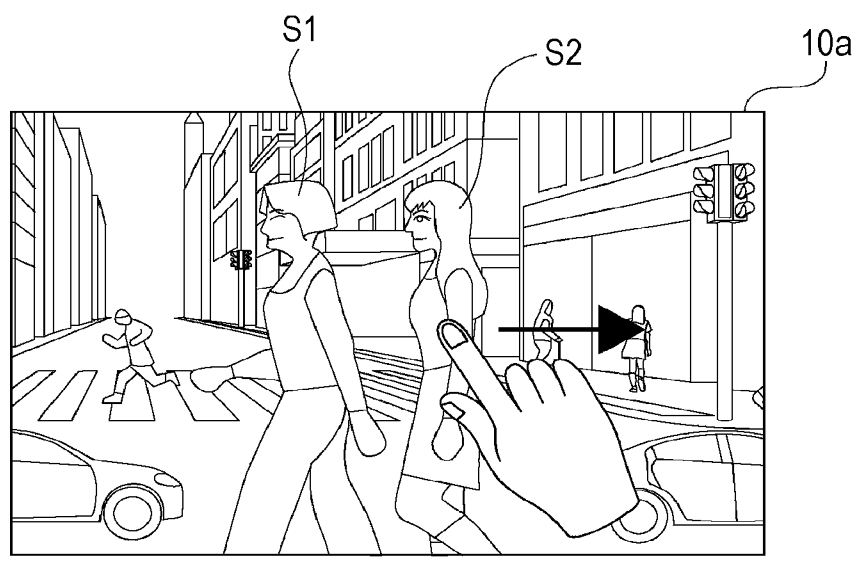
FIG. 4 is a diagram for explaining composition adjustment in a case where a detected subject is designated.

As illustrated in FIG. 4, it is assumed that a captured image in which two detected subjects as a subject S1 and a subject S2 are captured is displayed on the screen 10*a* of the display unit 10. Note that, at this time, it is assumed that tracking of the detected subject has not been performed yet.

In this example, in a state where the detected subject is displayed on the screen 10*a* as described above, tracking of the touched detected subject is started in response to an operation of touching the detected subject (an operation of touching the subject S2 in the example of FIG. 4). Specifically, the processing of controlling the panning-tilting operation of the platform device 50 is started such that the position of the touched detected subject is maintained at the position of the touched detected subject at the time of touch.

Here, a state where the detected subject is designated by the touch operation is, in other words, a state where the subject information corresponding to the designated position by the touch operation indicates the detected subject.

Here, subject tracking control processing in this example will be described with reference to FIG. 6.

In this example, proportional-integral-differential (PID) control is employed for control of the platform device 50 for tracking the subject. Specifically, as illustrated in FIG. 6A, an error d (position error d) between a position Ps of the subject as the tracking target and a target position Pt of tracking is calculated, and a control value C of the platform device 50 is calculated on the basis of the error d by $$C=P(d)+I(d)+D(d).$$

Note that P(d), I(d), and D(d) mean a proportional term, an integral term, and a differential term, respectively, for the error d.

FIG. 6B is a functional block diagram illustrating a functional configuration of the control unit 8 for achieving the subject tracking control processing. Note that since the control unit 8 controls the pan direction and the tilt direction as control for subject tracking, the configuration of the control system illustrated in FIG. 6B is actually provided for each of the pan direction and the tilt direction.

As illustrated, the control unit 8 includes a position error calculation processing unit F1, a control value calculation processing unit F2, and a drive amount conversion unit F3 as functional units for achieving subject tracking. At a time of tracking the subject, the position error calculation processing unit F1 receives input of the subject position Ps, which is the position of the subject as the tracking target, and the target position Pt of tracking, and calculates the error d thereof.

Here, in a case where a plurality of subjects is detected in the captured image as illustrated in FIG. 4, as the information of the subject position Ps, information of the position of the subject designated by the touch operation among information of positions of a plurality of subjects input from the image recognition processing unit 5 is used. Furthermore, the target position Pt is set as information of the position of the subject designated by the touch operation when the touch operation of the subject is performed.

Based on the error d input from the position error calculation processing unit F1, the control value calculation processing unit F2 calculates the control value C by performing calculation according to the above-described equation of PID control.

The drive amount conversion processing unit F3 converts the control value C calculated by the control value calculation processing unit F2, that is, a value in units of the number of pixels of the captured image into a value of an angle in a rotation direction as the pan direction or the tilt direction. The conversion can be performed on the basis of imaging parameters (focal length, size information of the imaging element, and the like) of the imaging device 1.

The control unit 8 outputs the value obtained by the conversion processing of drive amount conversion processing unit F3, that is, the value representing the driving amount in the pan direction or the tilt direction to the platform device 50 via the communication unit 11.

In the platform device 50, the value output from the control unit 8 via the communication unit 11 as described above is input to the drive control unit 57 via the communication unit 58. The drive control unit 57 drives the actuator 56 by a drive amount corresponding to the input value. Thus, the direction of the imaging device 1 is adjusted so that the position (Ps) of the subject to be tracked coincides with the target position (Pt) in the captured image, and the tracking of the subject is achieved.

Here, as described above, in this example, in a case where the operation of touching the detected subject in the screen 10*a* is performed, the position of the detected subject at the time of touch is set as the target position Pt in the tracking control. That is, the operation of touching the detected subject functions not only as the operation of designating the subject to be tracked but also as the operation of designating the arrangement position of the subject to be tracked in the screen.

Since the designation of the subject to be tracked and the designation of the arrangement position of the subject to be tracked in the screen can be achieved by a single operation of touching the detected subject, it is possible to reduce an operation burden on the user related to composition adjustment, and improve the operability.

The description is returned to FIG. 4.

It is assumed that after the detected subject in the screen 10*a* is touched, the finger that has made the touch is moved on the screen 10*a* as indicated by a thick arrow in FIG. 4 while maintaining the touch state.

In this example, the operation of tracing the screen 10*a* with the finger touching the subject while remaining in the touched state as described above is received as a movement instruction operation of the arrangement position (that is, the arrangement position in the captured image) of the touched subject (that is, the tracking target subject) in the screen 10*a*.

Figure 5:
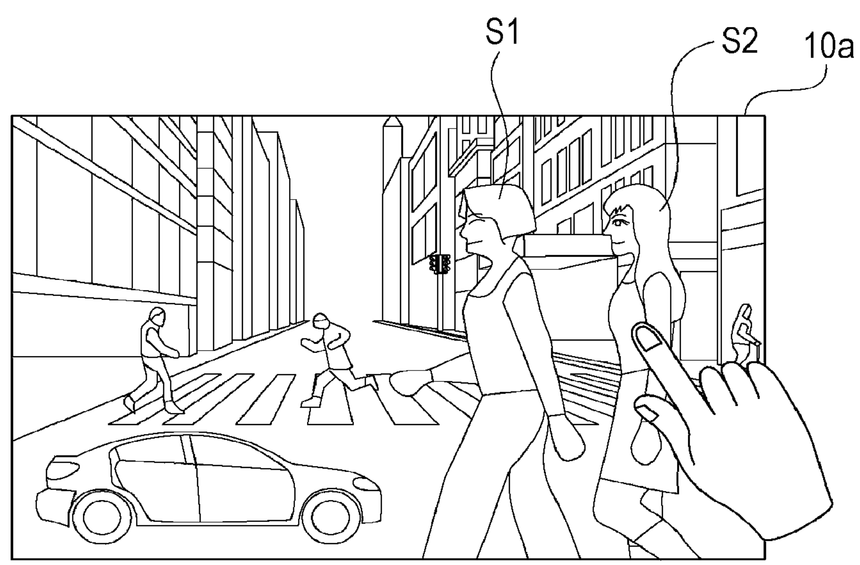
FIG. 5 is a diagram for explaining, together with FIG. 4, composition adjustment in a case where a detected subject is designated.

FIG. 5 illustrates a state of the screen 10*a* when the arrangement position of the subject is changed according to the tracing operation indicated by the thick arrow in FIG. 4.

The control unit 8 controls the platform device 50 such that the touched subject is moved by an amount corresponding to the amount of tracing in the direction traced by the tracing operation according to the tracing operation as described above.

At this time, the tracking state of the touched subject is maintained. Specifically, in the process in which the touch position gradually changes by the tracing operation, the control unit 8 sequentially updates the target position Pt to the touch position at that time every time the touch position changes. Thus, the position of the touched subject in the screen 10*a* can be smoothly changed in conjunction with the tracing operation.

Here, in this example, in response to the tracing operation after the detected subject is touched as described above, the arrangement position of the touched subject in the screen 10*a* is moved in the tracing direction by the tracing operation, and for this purpose, the control unit 8 controls the platform device 50 such that the imaging direction of the imaging device 1 changes in the direction opposite to the tracing direction.

Note that the tracing operation as described above is, in other words, an operation including designation of a direction in the plane of the screen 10*a*. Furthermore, such a tracing operation constitutes a part of the composition designation operation similarly to the operation of touching the detected subject (the operation of designating a position on the screen 10*a*).

Figure 7:
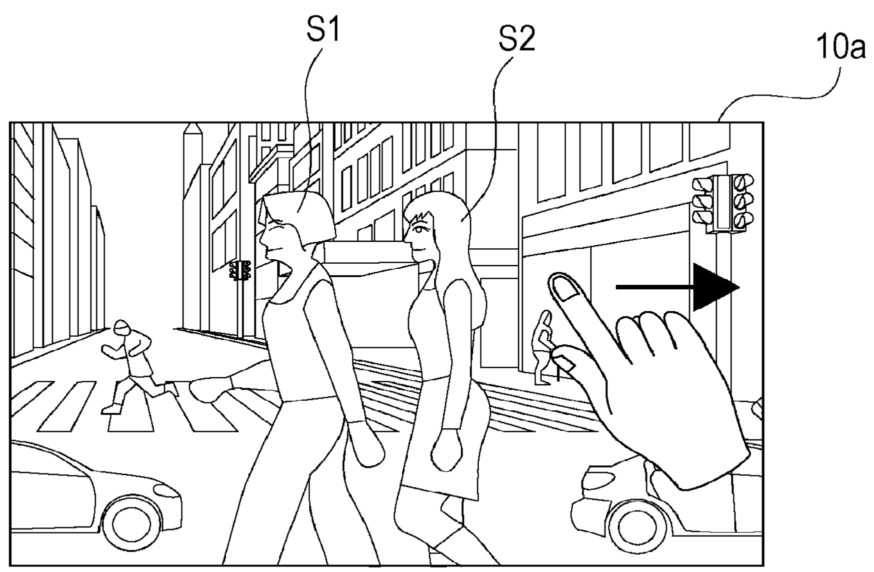
FIG. 7 is a diagram for explaining composition adjustment in a case where a subject other than the detected subject is designated.
Figure 8:
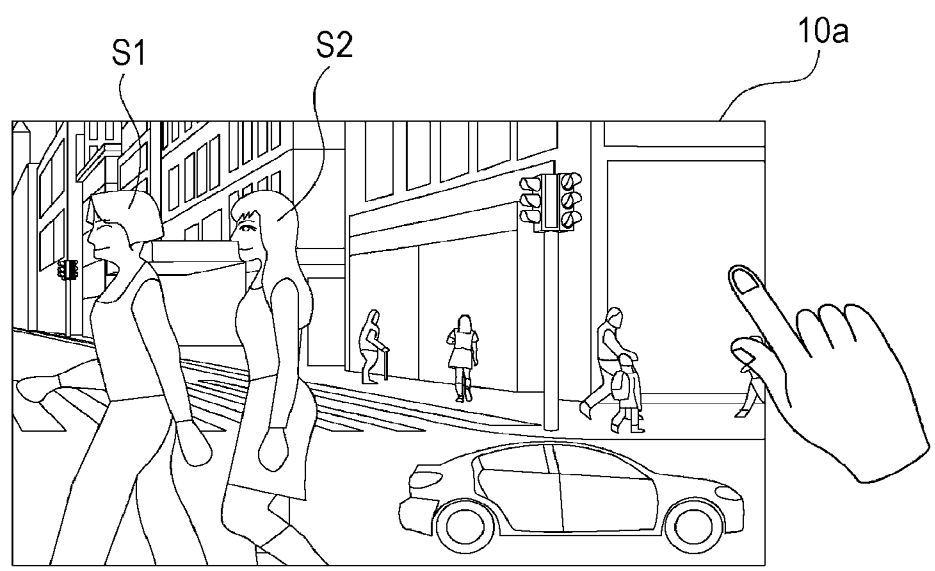
FIG. 8 is a diagram for explaining composition adjustment together with FIG. 7 in a case where a subject other than the detected subject is designated.

FIGS. 7 and 8 are diagrams for describing behavior in a case where the tracing operation as described above is performed after a subject other than the detected subject is touched.

It is assumed that, as illustrated in FIG. 7, after a subject as a background portion other than the subjects S1 and S2, which are detected subjects, is touched on the screen 10*a*, a tracing operation with the finger touching is performed.

In the present embodiment, the tracing operation after touching the subject other than the detected subjects in this manner is received as an operation of directly giving an instruction on the direction of change in the imaging direction. That is, for example, in a case where the tracing operation in the right direction is performed as illustrated in FIG. 7, the imaging direction is changed by an amount corresponding to the amount traced in the right direction as illustrated in FIG. 8. That is, the control unit 8 controls the platform device 50 such that the imaging direction is changed by the amount corresponding to the tracing amount in the tracing direction in response to the tracing operation after touching the subject other than the detected subjects.

Here, in a case where a subject other than the detected subjects is touched, the control unit 8 does not perform tracking control of the subject.

As described above, in this example, even in the same tracing operation, the changing direction of the imaging direction is reversed between a case of touching the detected subject and a case of touching the subject other than the detected subjects.

Here, the state where the subject other than the detection subjects is designated by the touch operation is, in other words, a state where the subject information corresponding to the designated position by the touch operation does not indicate the detected subject.

Furthermore, in the present embodiment, an angle of view can be changed by an operation on the screen.

Figure 9:
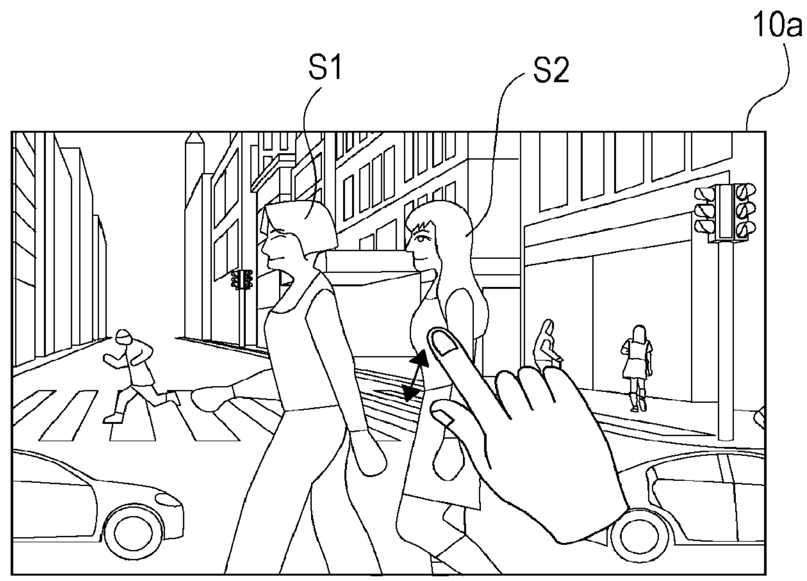
FIG. 9 is a diagram for explaining an operation of changing an angle of view.
Figure 10:
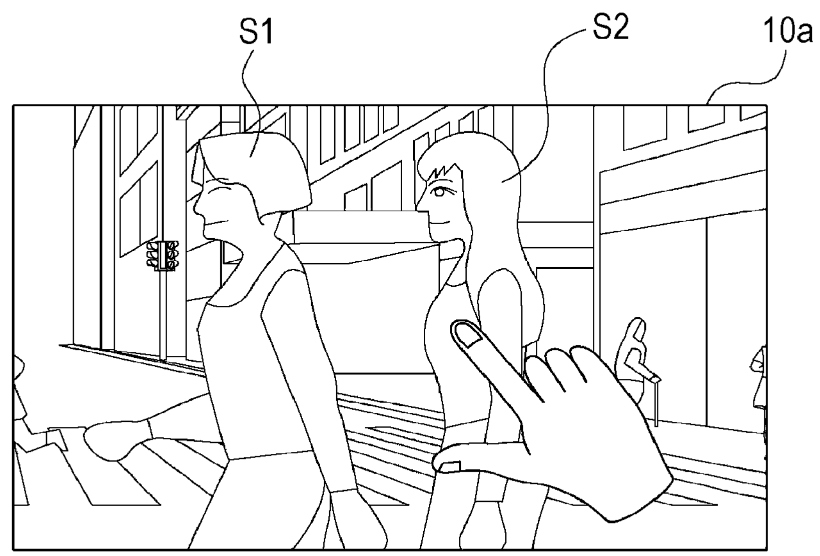
FIG. 10 is a diagram for explaining the operation of changing the angle of view together with FIG. 9.

FIGS. 9 and 10 are diagrams for explaining an operation of changing an angle of view.

In this example, after the first finger touches the screen 10*a*, in a case where another finger (second finger) touches the screen 10*a* while the touch state of the first finger is continued, the angle of view is changed according to the operation of tracing the screen 10*a* with the second finger.

Specifically, in this example, in a case where the touch position of the second finger changes in a direction away from the touch position of the first finger, the control unit 8 controls the driver unit 7 so that the zoom lens is driven in a direction of decreasing the angle of view (that is, zooming in). Thus, a change in the angle of view as illustrated as a transition from FIG. 9 to FIG. 10 is achieved.

On the other hand, in a case where the touch position of the second finger changes in a direction to approach the touch position of the first finger, the control unit 8 controls the driver unit 7 so that the zoom lens is driven in a direction of increasing the angle of view (that is, zooming out). The change in the angle of view in this case is a change represented as a transition from FIG. 10 to FIG. 9.

Note that in FIGS. 9 and 10, the change of the angle of view corresponding to the case where the detected subject is touched with the first finger has been exemplified, but also in a case where a subject other than the detected subjects is touched with the first finger, the control unit 8 performs control of the angle of view similar to that described above.

The tracing operation with the second finger described above is, in other words, an operation including designation of a direction in the plane of the screen 10*a*.

Furthermore, the change (control) of the angle of view is one aspect of the change (control) of the imaging range by the imaging device 1.

Furthermore, in the present embodiment, in a case where the operation of touching the screen 10*a* is performed again after the subject to be tracked is designated by the touch operation, in other words, in a case where an operation of double-tapping the screen 10*a* including the tap of the detected subject is performed, adjustment to a composition in which the tracking target subject is arranged at a predetermined position in the captured image is performed.

Note that the "tap" mentioned here means a series of operations from touching the screen 10*a* with a finger to releasing the finger from the screen 10*a*. Furthermore, the double tap operation here means an operation of performing a second tap within a predetermined time after the first tap.

Figure 11:
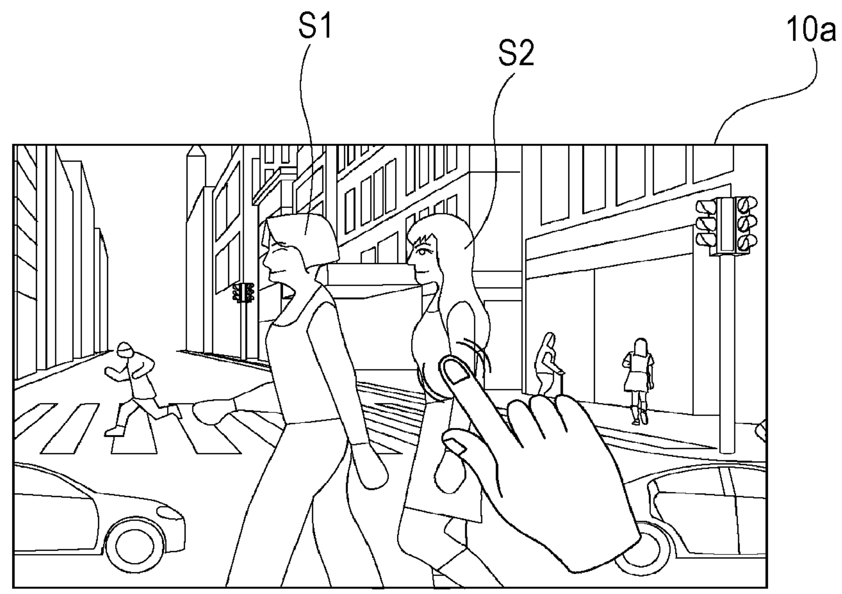
FIG. 11 is a diagram for explaining composition adjustment according to a double tap operation.
Figure 12:
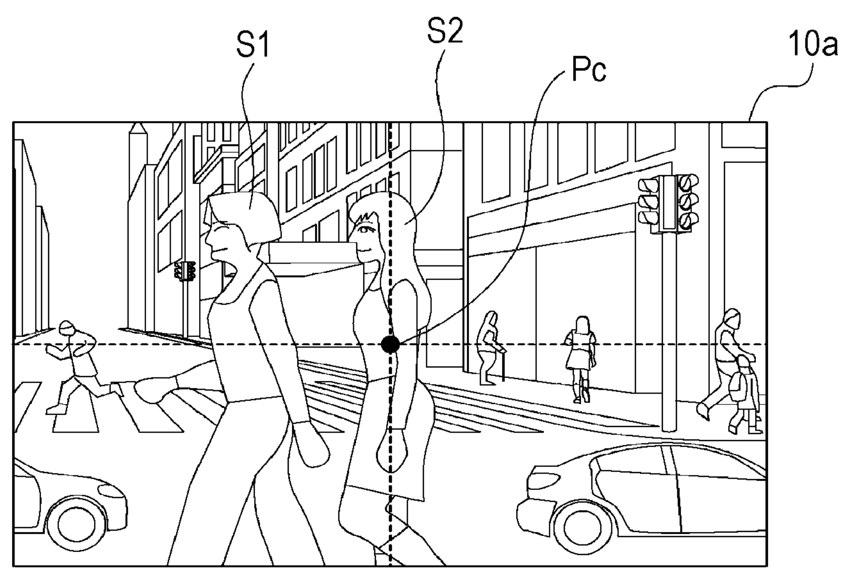
FIG. 12 is a diagram for explaining composition adjustment according to a double tap operation together with FIG. 11.

FIGS. 11 and 12 are explanatory diagrams of composition adjustment according to such a double tap operation.

In this example, in a case where the double tap operation as described above is performed, adjustment is performed to a composition in which the tracking target subject (the subject S2 in the example of FIG. 11) designated by the first tap is arranged at a center position Pc of the angle of view (the center position of the captured image) (see FIG. 12).

Specifically, in response to the double tap operation as described above, the control unit 8 updates the target position Pt of tracking to the center position Pc and continues the tracking control of the subject.

1-3. Processing Procedure

An example of a specific processing procedure for achieving the composition adjustment method as the embodiment described above will be described with reference to a flowchart of FIG. 13.

Figure 13:
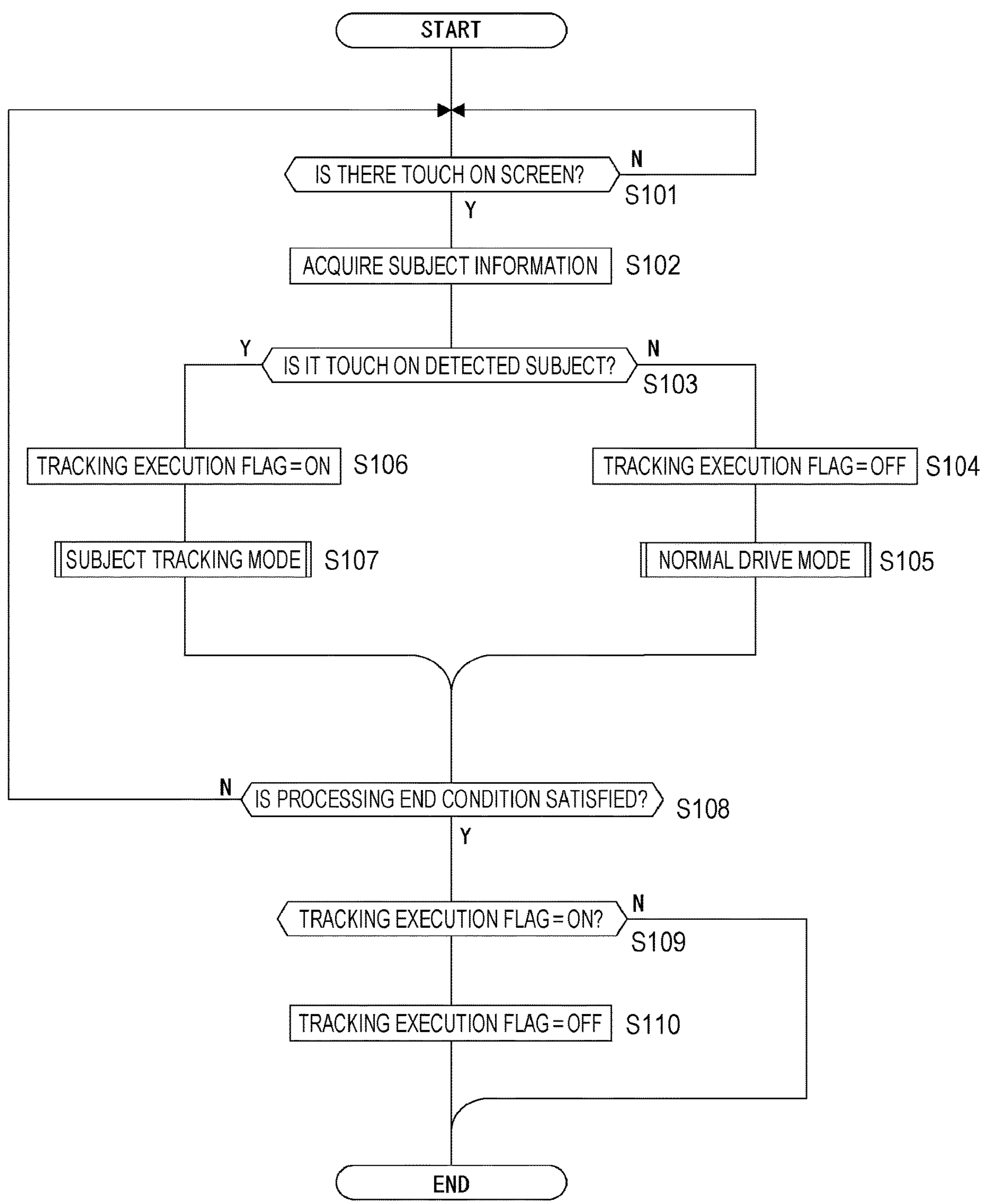
FIG. 13 is a flowchart illustrating an example of a specific processing procedure for achieving a composition adjustment method as the first embodiment.

Note that the processing illustrated in FIG. 13 is executed by the control unit 8 according to a program stored in a memory such as a ROM.

In FIG. 13, in step S101, the control unit 8 waits until there is a touch on the screen 10*a*, and in a case where there is a touch on the screen 10*a*, the control unit 8 executes processing of acquiring the subject information Is from the image recognition processing unit 5 as subject information acquisition processing in step S102, and determines whether or not it is a touch on the detected subject in step S103. That is, it is determined whether or not the position on the screen 10*a* designated by the touch operation detected in step S101 (that is, the touch start position on the screen 10*a*) is a position within the range of the subject included in the subject information Is acquired in step S102.

In step S103, in a case where a negative result is obtained indicating that the position on the screen 10*a* designated by the touch operation is not the position within the range of the subject included in the subject information Is and is not the touch of the detected subject, the control unit 8 proceeds to step S104 to turn OFF a tracking execution flag, and executes normal drive mode processing in subsequent step S105.

Here, the tracking execution flag is a flag indicating whether or not to execute the subject tracking control processing described with reference to FIG. 6, and in a case where the tracking execution flag is turned ON, the control unit 8 starts the subject tracking control processing in parallel with the processing illustrated in FIG. 13. When the tracking execution flag is OFF, the control unit 8 does not execute the tracking control processing.

Note that the initial value of the tracking execution flag is OFF, but the reason why the tracking execution flag is turned OFF in step S104 is to stop the tracking control of the subject when an operation to touch a subject other than the detected subject is performed after the detected subject is touched and the tracking control of the subject is started (step S103: N).

Note that the normal drive mode processing in step S105 is a process for changing the imaging direction according to the tracing operation by the finger touching the subject other than the detected subject, or for adjusting the angle of view according to the tracing operation by the second finger, the details of which will be described later.

Furthermore, in a case where an affirmative result indicating that the touch is the touch of the detected subject is obtained in step S103, the control unit 8 proceeds to step S106 to turn ON the tracking execution flag, and then executes subject tracking mode processing in step S107.

Figure 15:
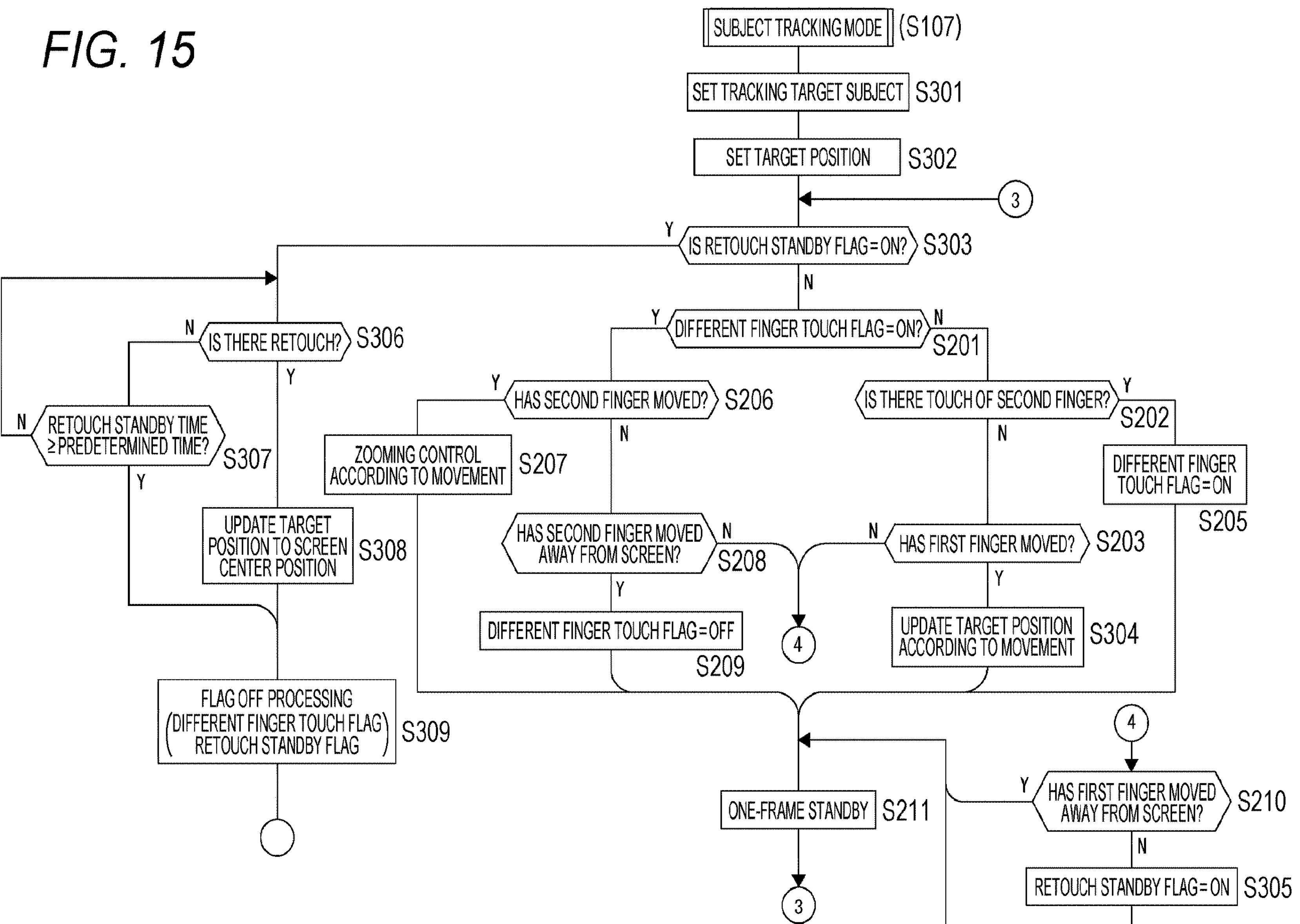
FIG. 15 is a flowchart of subject tracking mode processing according to the embodiment.

Here, in response to the turning ON of the tracking execution flag in step S106, the control unit 8 starts the subject tracking control processing based on the setting information (setting information of the tracking target subject and the target position Pt) by the processing in steps S301 and S302 described in FIG. 15. In the tracking control processing, the control unit 8 executes acquisition of the subject information Is (in particular, information of the subject position Ps of the tracking target subject) from the image recognition processing unit 5 for each frame, and uses the subject information Is for calculation of the error d and the like.

Note that the normal drive mode processing in step S105 is processing for performing control to move the subject position in the screen 10*a* according to the tracing operation by the finger touching the detected subject, or for adjusting the angle of view according to the tracing operation by the second finger, the details of which will be described later.

The control unit 8 advances the processing to step S108 in each of a case where the normal drive mode processing of step S105 is executed and a case where the subject tracking mode processing of step S107 is executed.

In step S108, the control unit 8 determines whether or not processing end condition is satisfied. The processing end condition here means an end condition of the processing illustrated in FIG. 13, and is conceivably set to a condition that, for example, there is performed an operation of switching an operation mode of the imaging device 1 from an imaging mode in which a captured image as a through image is displayed on the screen 10*a* to a reproduction mode in which an image reproduced from a recording medium by the recording control unit 6 is displayed on the screen 10*a*, or the like.

In a case where it is determined that the processing end condition is not satisfied, the control unit 8 returns to step S101 and waits again for a touch operation on the screen 10*a*.

Thus, in a case where the screen 10*a* is touched again after the detected subject or the subject other than the detected subject is touched and the touched finger is separated from the screen 10*a*, the normal drive mode processing in step S105 or the subject tracking mode processing in step S107 is executed depending on whether the touch is a touch on the subject other than the detected subject or a touch on the detected subject.

On the other hand, in a case where it is determined in step S108 that the processing end condition is satisfied, the control unit 8 determines whether or not the tracking execution flag is ON in step S109, and then if the tracking execution flag is ON, the control unit 8 sets the tracking execution flag to OFF in step S110 and ends the series of processing illustrated in FIG. 13, and if the tracking execution flag is not ON, the control unit 8 passes the processing of step S110 and ends the series of processing illustrated in FIG. 13.

Figure 14:
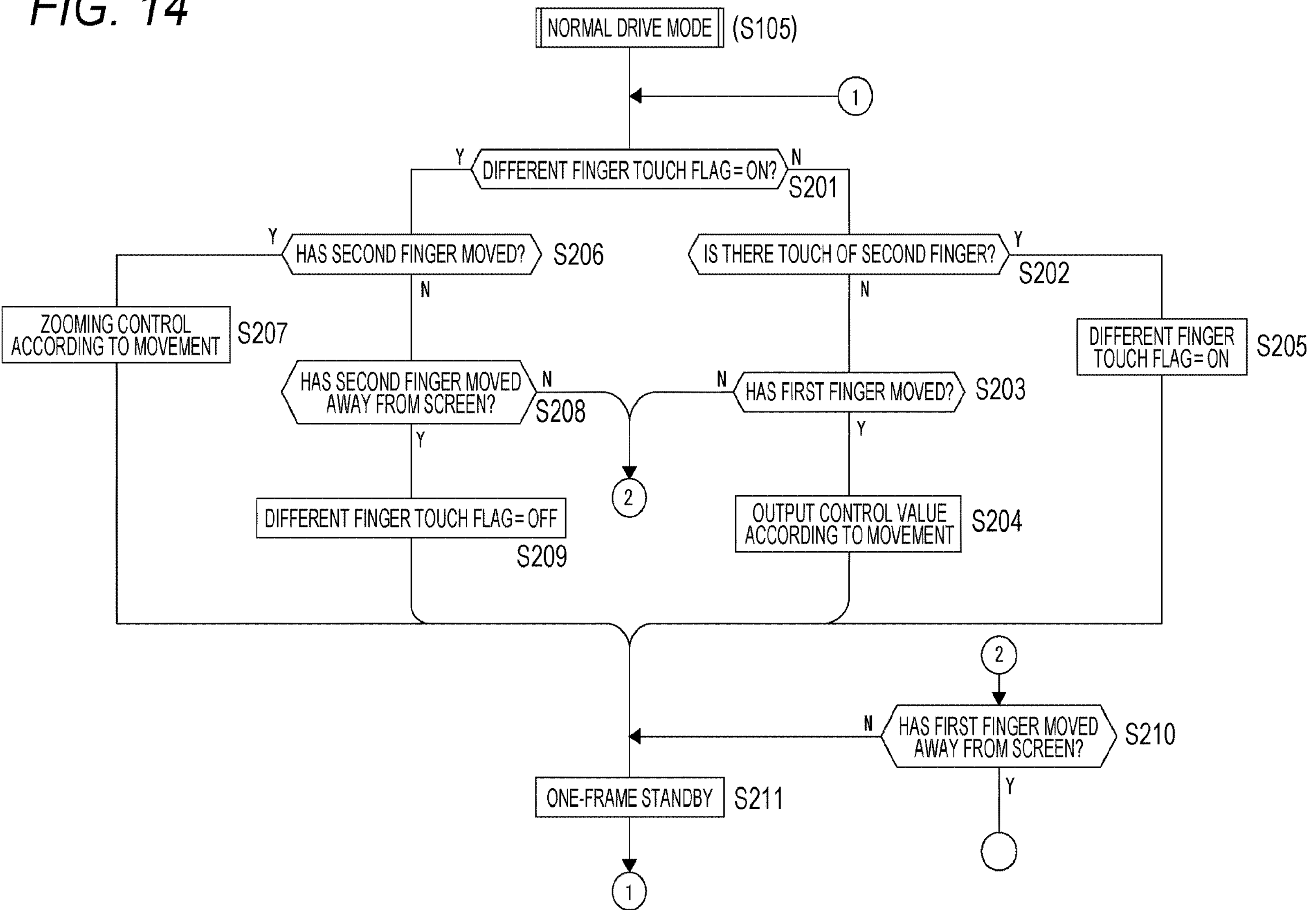
FIG. 14 is a flowchart of normal drive mode processing according to the embodiment.

FIG. 14 is a flowchart of the normal drive mode processing in step S105.

The processing illustrated in FIG. 14 is processing repeatedly executed for each frame of the captured image by the standby processing in step S211 until it is detected in step S210 that the first finger (that is, the finger for which the touch operation is detected in step S101) has moved away from the screen 10*a*.

In FIG. 14, in step S201, the control unit 8 determines whether or not a different finger touch flag is ON. The different finger touch flag is a flag indicating whether or not the second finger (see the operation of changing the angle of view described above) is in a touched state, and is turned ON in step S205 as described later in a case where there is a touch of the second finger, and is turned OFF in step S209 in response to moving away of the second finger from the screen 10*a*. At a time of start of the processing illustrated in FIG. 14, the different finger touch flag is OFF.

If the different finger touch flag is not ON in step S201, the control unit 8 proceeds to step S202 to determine whether or not there is a touch of the second finger, and then if there is no touch of the second finger, the control unit 8 proceeds to step S203 to determine whether or not the first finger has moved.

In a case where the first finger has moved, the control unit 8 proceeds to step S204 and executes processing of outputting control values according to the movement. That is, processing is executed for outputting control values (control values of both the actuator in the pan direction and the actuator in the tilt direction) of the platform device 50 according to the moving direction and the moving amount of the first finger to the platform device 50 via the communication unit 11.

Thus, in a case where the subject other than the detected subject is touched and the touched finger is traced in any direction on the screen 10*a*, the pan and tilt operations of the platform device 50 are controlled such that the imaging direction of the imaging device 1 is changed by an amount corresponding to the tracing amount in the tracing direction.

In response to the execution of the output processing of step S204, the control unit 8 executes one-frame standby processing of step S211 and returns to step S201. Thus, while the movement of the first finger is continuously performed, the processing of step S204 is repeated for each frame, so that the imaging direction is continuously changed.

Furthermore, in a case where it is determined in step S203 that the first finger has not moved, the control unit 8 proceeds to step S210 and determines whether or not the first finger has moved away from the screen 10*a*.

If the first finger is not moved away from the screen 10*a*, the control unit 8 proceeds to the one-frame standby processing in step S211. That is, while the first finger maintains the touch state, the processing illustrated in FIG. 14 is repeated for each frame.

On the other hand, in a case where the first finger has moved away from the screen 10*a*, the control unit 8 ends the normal drive mode processing in step S105.

Furthermore, in a case where it is determined in step S202 that the second finger touch has been made, the control unit 8 turns ON the different finger touch flag in step S205, executes the one-frame standby processing in step S211, and then returns to step S201.

In a case where it is determined in step S201 that the different finger touch flag is ON, the control unit 8 proceeds to step S206 and determines whether or not the second finger has moved. If the second finger has moved, the control unit 8 proceeds to step S207 and performs zooming control according to the movement. That is, if the movement of the second finger is in a direction away from the touch position of the first finger, the driver unit 7 is controlled to drive the zoom lens in a zoom-in direction, and if the movement of the second finger is in a direction approaching the touch position of the first finger, the driver unit 7 is controlled to drive the zoom lens in a zoom-out direction.

In response to the execution of the zooming control in step S207, the control unit 8 executes the one-frame standby processing in step S211, and returns to step S201. Thus, while the movement of the second finger is continued, the zooming control in step S207 is repeated to continue the change of the angle of view.

On the other hand, in a case where it is determined in step S206 that the second finger has not moved, the control unit 8 proceeds to step S208 and determines whether or not the second finger has moved away from the screen 10*a*. In a case where it is determined that the second finger has not moved away from the screen 10*a*, the control unit 8 proceeds to step S210 described above and determines whether or not the first finger has moved away from the screen 10*a*. That is, in this example, even if the second finger has not moved away from the screen 10*a*, in a case where the first finger has moved away from the screen 10*a*, the normal drive mode processing in step S105 ends. That is, the user releases the first finger touching the subject other than the detected subject from the screen 10*a*, and then touches the detected subject, by which it is possible to given an instruction on tracking of the touched detected subject or changing of the arrangement position of the tracking target subject by the tracing operation.

On the other hand, in a case where it is determined that the second finger has moved away from the screen 10*a*, the control unit 8 proceeds to step S209 to turn OFF the different finger touch flag, executes the one-frame standby processing of step S211, and then returns to step S201.

Thus, even after the second finger has moved away from the screen 10*a*, while the touch state of the first finger continues, control to change the imaging direction according to the tracing operation of the first finger is performed.

FIG. 15 is a flowchart of the subject tracking mode processing in step S107.

Note that in the following description, the same step numbers will be used for processing similar to the already described processing, and description thereof is omitted.

In the subject tracking mode processing in step S107, the control unit 8 first sets the tracking target subject in step S301. That is, the detected subject designated by the touch operation detected in step S101 is set as the tracking target subject.

In subsequent step S302, the control unit 8 sets the target position Pt. That is, the position (subject position Ps) of the detected subject designated by the touch operation detected in step S101 is set as the target position Pt of tracking.

Next, in step S303, the control unit 8 determines whether or not a retouch standby flag is ON. The retouch standby flag is a flag for identifying whether or not it is a standby state for a second tap operation in the double tap operation described above, and ON represents the standby state, and an initial value is OFF. As will be described later, the retouch standby flag is turned ON by the processing of step S305 in response to the moving away of the first finger from the screen 10*a* (step S210: Y).

In step S303, when the retouch standby flag is not ON, the control unit 8 advances the processing to step S201. Here, processing from step S201 to step S211 is similar to the processing described with reference to FIG. 14, and thus redundant description is avoided.

However, in this case, in a case where it is determined in step S203 that the first finger has moved, the control unit 8 proceeds to step S304 and executes update processing of the target position Pt according to the movement. That is, the target position Pt is updated to the current touch position of the first finger.

In response to the execution of the update processing in step S304, the control unit 8 proceeds to the one-frame standby processing in step S211. Thus, while the first finger is moving, the update processing in step S304 is repeatedly executed for each frame. Therefore, the movement of the tracking target subject on the screen 10*a* becomes smooth.

Furthermore, in the processing of FIG. 15, in a case where it is determined in step S210 that the first finger has moved away from the screen 10*a*, the control unit 8 turns ON the retouch standby flag in step S305, performs the one-frame standby processing in step S211, and then returns to step S303.

In a case where it is determined in step S303 that the retouch standby flag is ON, the control unit 8 advances the processing to step S306. The processing in and after step S306 is processing corresponding to the double tap operation.

First, in step S306, the control unit 8 determines whether or not there is a retouch on the screen 10*a*, and if there is no retouch on the screen, the control unit 8 determines in step S307 whether or not a retouch waiting time is equal to or longer than a predetermined time. The retouch waiting time means an elapsed time from when it is determined in step S210 that the first finger has moved away.

If the retouch waiting time is not equal to or longer than the predetermined time, the control unit 8 returns to step S306. That is, by the processing of steps S306 and S307, the control unit 8 waits for the touch operation (that is, the touch operation as a second tap) within a predetermined time after the first finger is released.

In a case where it is determined in step S307 that there is a retouch, the control unit 8 proceeds to step S308 and performs processing of updating the target position Pt to the screen center position (the center position Pc of the angle of view). Thus, in response to the double tap operation being performed, the composition is adjusted such that the position (Ps) of the tracking target subject designated by the first tap coincides with the center position Pc.

In response to the execution of the update processing in step S308, the control unit 8 executes flag OFF processing in step S309, that is, the processing of turning OFF the different finger touch flag and the retouch standby flag, and terminates the series of processing illustrated in FIG. 15.

As can be seen with reference to FIG. 13, after executing the subject tracking mode processing in step S107, if it is not determined in step S108 that the processing end condition is satisfied, the control unit 8 proceeds to the processing in step S101. Thus, in this example, even after the tracking target subject is moved to the center of the screen 10*a* by the double tap operation, the touch operation on the screen 10*a* is received, the processing of FIG. 14 is executed if the touch operation is an operation of touching the subject other than the detected subject, and the processing of FIG. 15 is executed if the touch operation is an operation of touching the detected subject.

2. Second Embodiment

Next, a second embodiment will be described.

In the second embodiment, a parameter corresponding to a type of a subject is used in the subject tracking control processing.

Note that in the second embodiment, configurations of the imaging device 1 and the platform device 50 are similar to those of the case of the first embodiment, and thus redundant description is avoided.

Figure 16:
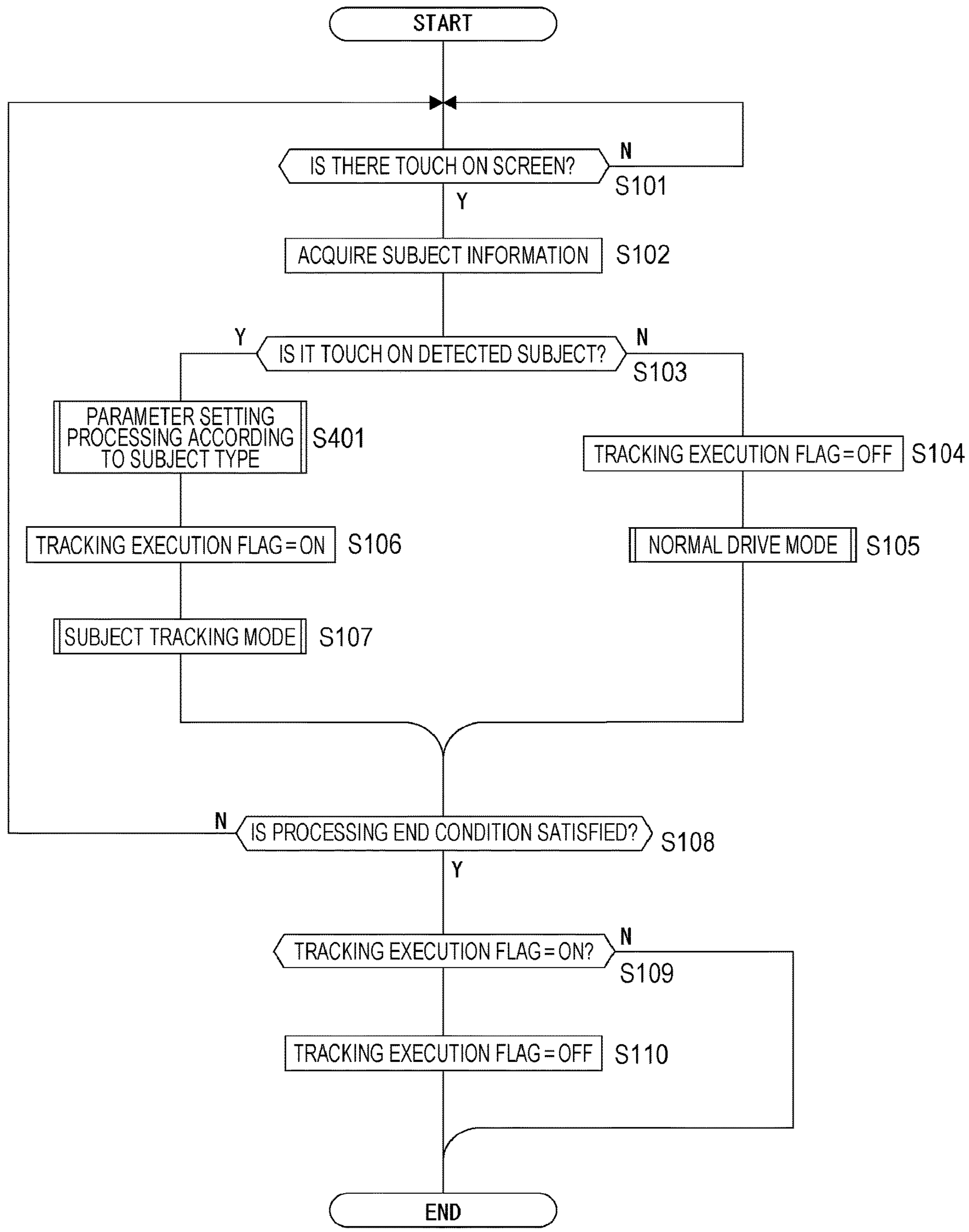
FIG. 16 is a flowchart illustrating an example of a specific processing procedure for achieving a composition adjustment method as a second embodiment.

FIG. 16 is a flowchart illustrating an example of a specific processing procedure for achieving a composition adjustment method as the second embodiment.

In FIG. 16, the processing of steps S101 to S110 is similar to those in the case of FIG. 13.

In this case, in a case where it is determined in step S103 that the touch is a touch of the detected subject, the control unit 8 proceeds to step S401, executes the parameter setting processing according to the subject type, and then proceeds to step S106.

Figure 17:
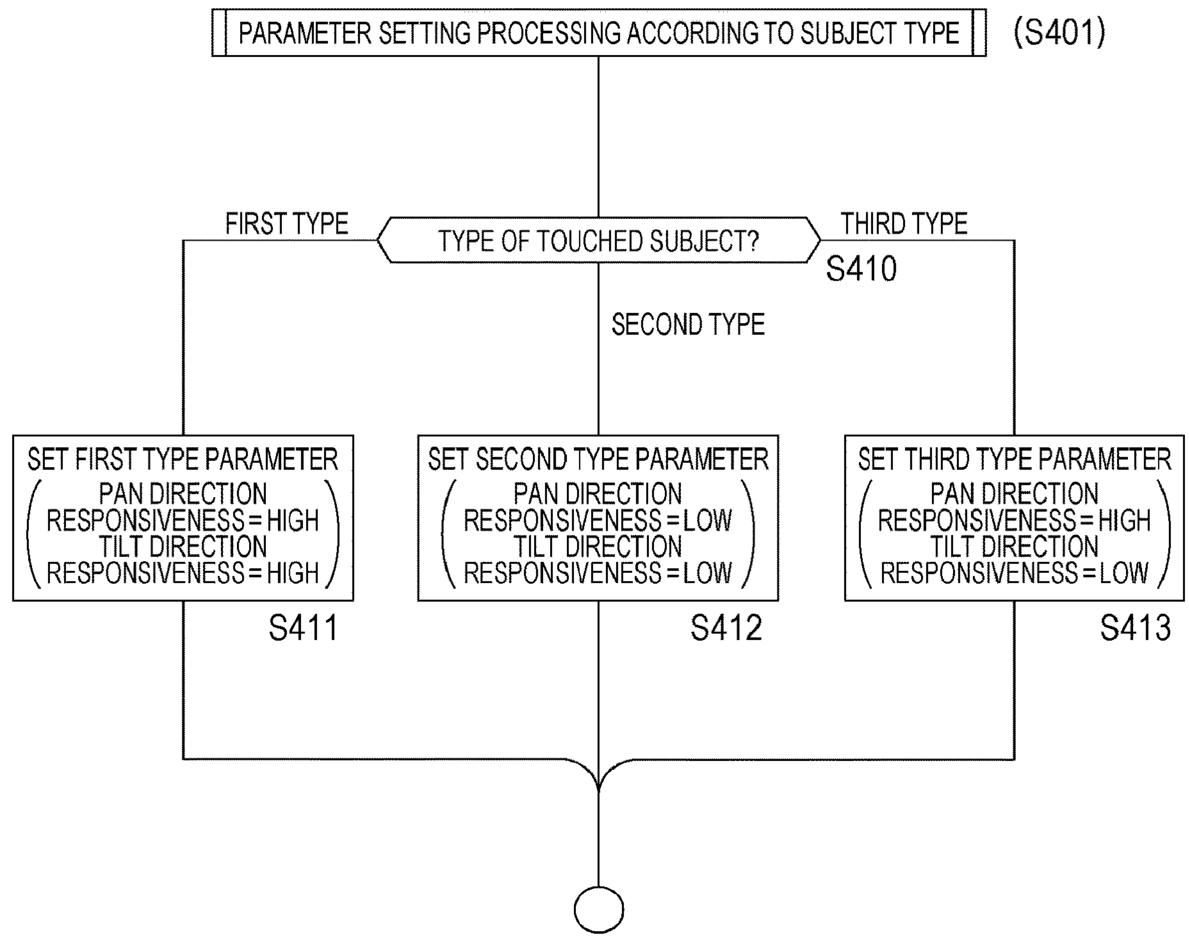
FIG. 17 is a flowchart illustrating an example of parameter setting processing according to a subject type.

FIG. 17 is a flowchart illustrating parameter setting processing according to a subject type in step S401.

First, in step S410, the control unit 8 checks the type of the touched subject. Here, the image recognition processing unit 5 in this example recognizes three types of first type, second type, and third type as the type of the detected subject. In step S410, the control unit 8 checks whether the type of the touched subject is the first type, the second type, or the third type.

Here, in this example, the first type is "bird" (see FIG. 18A), the second type is "person" (see FIG. 18B), and the third type is "dog" (see FIG. 18C).

Note that, regarding the first type, the "bird" is merely an example, and the first type is only required to be a type of a subject that tends to be imaged on a telephoto side and moves relatively fast vertically and horizontally like the "bird".

Similarly, regarding the second type, the "person" is an example, and is only required to be a type of a subject that relatively slowly moves vertically and horizontally, and for the third type, the "dog" is an example, and is only required to be a type of a subject that relatively slowly moves vertically but relatively quickly moves horizontally.

In a case where the type of the touched subject is the first type, the control unit 8 proceeds to step S411, sets the first type parameter, and ends the processing of step S401. Furthermore, in a case where the type of the touched subject is the second type, the control unit 8 sets the second type parameter in step S412 and ends the processing of step S401, and in a case where the type of the touched subject is the third type, the control unit 8 sets the third type parameter in step S413 and ends the processing of step S401.

Here, in this example, specific examples of the parameter used in the tracking control processing can include a control cycle of tracking control and a gain (gain of proportional term, integral term, and derivative term) in PID control. As the processing of setting the first parameter (parameter in the case of "bird") in step S411, the control unit 8 sets a parameter for increasing responsiveness of tracking for each of the tracking control processing in the pan direction and the tracking control processing in the tilt direction. Specifically, for example, the control cycle is set to the shortest cycle among settable cycles, and the gain in the PID control is set to the highest value among settable values.

Furthermore, as the processing of setting the second parameter (parameter in the case of "person") in step S412, the control unit 8 sets a parameter for decreasing the responsiveness of tracking for each of the tracking control processing in the pan direction and the tracking control processing in the tilt direction. Specifically, for example, the control cycle is set to a longer cycle (for example, a double cycle) than the above-described shortest cycle, and the gain in the PID control is set to a value lower than the above-described maximum value.

Moreover, as the processing of setting the third parameter (parameter in the case of "dog") in step S413, the control unit 8 sets a parameter that increases the responsiveness of tracking with respect to the tracking control processing in the pan direction and decreases the responsiveness of tracking with respect to the tracking control processing in the tilt direction.

Here, in this example, in a case where the control cycle of the tracking control is set to a cycle that is twice the shortest cycle as in the second parameter described above, in the tracking control processing, the control unit 8 integrates the tracking result (control value C) calculated in the shortest cycle, in other words, the tracking results of two times, and uses the integrated value for control of the platform device 50. Thus, the influence of noise can be reduced, and stability of tracking control can be improved.

By performing the parameter setting according to the type of the subject as described above, it is possible to set an optimum parameter according to movement characteristics for each type of the subject regarding the tracking control of the subject, and it is possible to improve the accuracy of the tracking control.

Furthermore, in this example, the parameter setting is individually performed for each of the tracking control in the pan direction and the tracking control in the tilt direction according to the type of the subject, but this configuration enables tracking with excessively increased responsiveness to be prevented from being performed in a direction in which it is unnecessary to increase the tracking responsiveness, and the stability of the tracking control can be improved.

Here, in the above description, the parameter setting example in which the tracking responsiveness in the pan direction is increased and the tracking responsiveness in the tilt direction is decreased according to the type of the "dog" has been described, but depending on the type of the subject, the parameter setting can also be performed in which the tracking responsiveness in the pan direction is decreased and the tracking responsiveness in the tilt direction is increased conversely.

For example, when the type of the subject is a relatively large immovable body such as a house or a building, and the imaging person performs imaging while moving around the subject, it is conceivable to perform parameter setting for decreasing the tracking responsiveness in the pan direction and increasing the tracking responsiveness in the tilt direction. Alternatively, it is also conceivable to similarly decrease the tracking responsiveness in the pan direction and increase the tracking responsiveness in the tilt direction corresponding to a type of subject assumed to move violently only in the vertical direction by a trampoline or the like.

Figure 19:
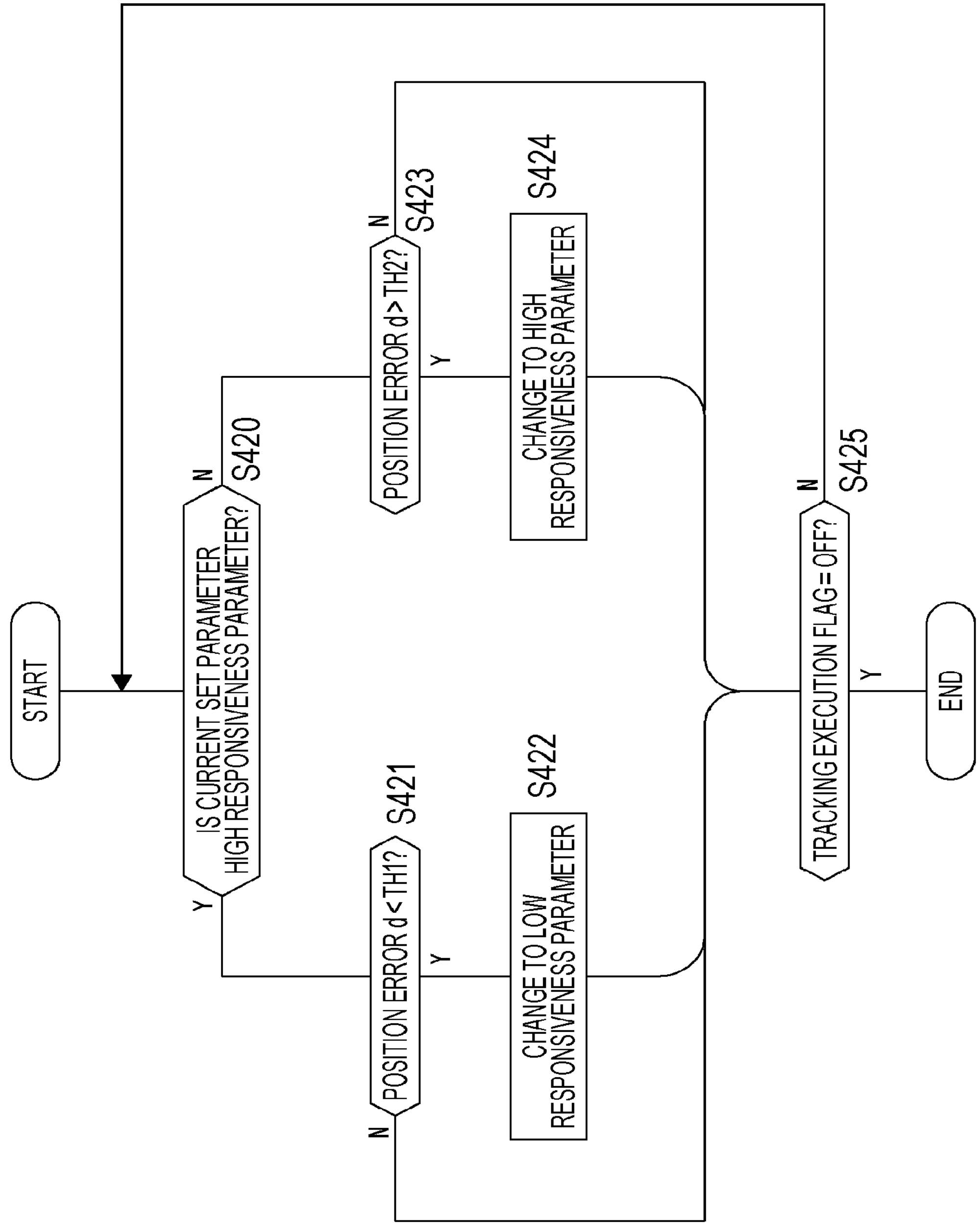
FIG. 19 is a flowchart illustrating an example of processing for parameter adjustment.

Furthermore, in the second embodiment, the control unit 8 starts the processing for parameter adjustment illustrated in FIG. 19 in response to the execution of the parameter setting processing illustrated in FIG. 17.

Here, the processing of FIG. 19 is executed for each of the tracking control processing in the pan direction and the tracking control processing in the tilt direction.

In FIG. 19, in step S420, the control unit 8 determines whether or not the current setting parameter is a high responsiveness parameter. The high responsiveness parameter means a parameter that increases the tracking responsiveness described in the processing of steps S411 to S412 described above. For example, the parameters set in the pan direction and the tilt direction in step S411 are high responsiveness parameters.

In a case where it is determined that the current setting parameter is the high responsiveness parameter, the control unit 8 proceeds to step S421 and determines whether or not the position error d is smaller than a threshold value TH1. In a case where the position error d is smaller than the threshold value TH1, the control unit 8 performs processing of changing to the low responsiveness parameter in step S422. The low responsiveness parameter means a parameter that decreases the tracking responsiveness described in the processing of steps S411 to S412 described above. In step S422, the parameter used in the tracking control processing is changed to the low responsiveness parameter.

Thus, in a case where the position error d is extremely small after the setting of the high responsiveness parameter, the parameter of the tracking control can be adjusted to the low responsiveness parameter.

In response to the execution of the change processing in step S422, the control unit 8 advances the processing to step S425. Furthermore, in a case where it is determined in step S421 that the position error d is not smaller than the threshold value TH1, the control unit 8 proceeds the processing to step S425 without executing the change processing of step S422.

Furthermore, in a case where it is determined that the current setting parameter is not the high responsiveness parameter in step S420, the control unit 8 proceeds to step S423 and determines whether or not the position error d is larger than a threshold value TH2. In a case where the position error d is larger than the threshold value TH2, the control unit 8 performs processing of changing to the high responsiveness parameter in step S424.

Thus, in a case where the position error d is extremely large after the setting of the low responsiveness parameter, the parameter of the tracking control can be adjusted to the high responsiveness parameter.

In response to the execution of the change processing in step S424, the control unit 8 advances the processing to step S425. Furthermore, in a case where it is determined in step S423 that the position error d is not larger than the threshold value TH1, the control unit 8 proceeds the processing to step S425 without executing the change processing of step S424.

In step S425, the control unit 8 determines whether or not the tracking execution flag is OFF, and if the tracking execution flag is not OFF, the control unit 8 returns to step S420, or if it is OFF, the control unit 8 terminates the series of processing illustrated in FIG. 19. That is, the processing illustrated in FIG. 19 is executed during a period in which the subject tracking control processing is being executed.

By performing the parameter adjustment based on the position error d as described above, it is possible to achieve the parameter adjustment based on the determination result as to whether or not the set parameter is suitable for the actual movement of the subject, and the stability of the tracking control can be improved.

Note that FIG. 19 is an example in which the parameter adjustment is performed on the basis of the comparison result between the position error d and the threshold value TH, but alternatively, the parameter adjustment can be performed on the basis of the comparison result between the control value C and the corresponding threshold value. Even in a case of such parameter adjustment, there is no difference in that the parameter adjustment is performed on the basis of the error between the position of the subject and the tracking target position.

In the above description, an example of two-stage adjustment of the high responsiveness parameter and the low responsiveness parameter has been described, but the parameter adjustment can be adjustment between three or more stages of parameters.

3. Third Embodiment

3-1. First Example

In a third embodiment, composition adjustment is performed on the basis of simplified model information of a human body.

Note that also in the third embodiment, configurations of the imaging device 1 and the platform device 50 are similar to those of the case of the first embodiment, and thus redundant description is avoided.

First, the simplified model information of the human body will be described with reference to FIG. 20.

Figure 20:
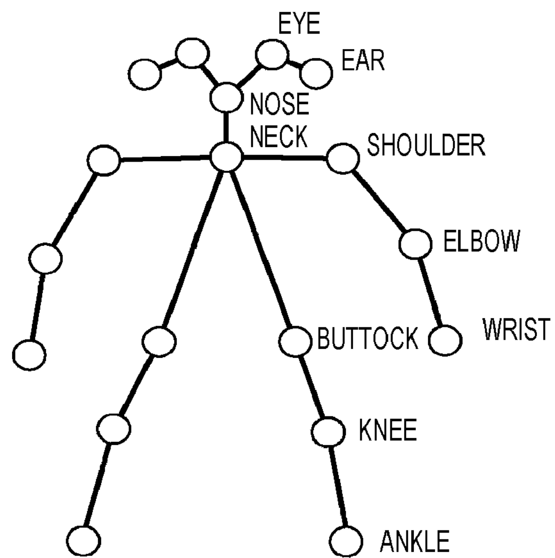
FIG. 20 is an explanatory diagram of simplified model information of a human body.

As illustrated in FIG. 20, the simplified model information of the human body is information indicating an arrangement state of a plurality of parts constituting the human body such as eyes, ears, a nose, a mouth, a neck, shoulders, elbows, wrists, buttocks, knees, and ankles in the human body. In the third embodiment, in a case where the detected subject is a subject as a human, the image recognition processing unit 5 generates such simplified model information of the human body for the subject.

Specifically, the image recognition processing unit 5 generates information of detection points (black circles in the drawings) of a specific part such as an eye, a neck, and a shoulder in a detected subject as a person and lines connecting the detection points as the simplified model information. At this time, each detection point is connected to a specific other detection point by a line. The detection points connected by lines are defined, thereby forming a simple model expressing the human body by points and lines.

In this case, the image recognition processing unit 5 outputs the simplified model information to the control unit 8 as a part of the subject information Is in response to a request from the control unit 8. Also in this example, the control unit 8 executes acquisition of the subject information Is from the image recognition processing unit 5 for each frame during the subject tracking.

Hereinafter, a first example and a second example will be described as examples of composition adjustment based on the simplified model information as described above.

In a first example, composition switching is performed between a plurality of compositions in which combinations of regions of a subject appearing in a captured image are different on the basis of the simplified model information of the human body.

Figure 21:
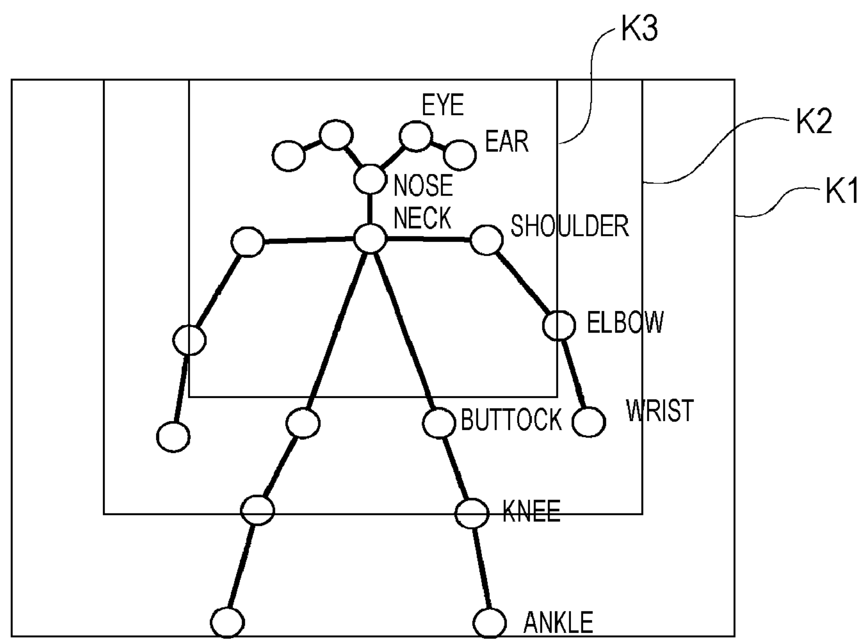
FIG. 21 is a diagram illustrating an example of a composition in which switching is performed on the basis of the simplified model information.

Specifically, composition switching is performed among a composition K1, a composition K2, and a composition K3 illustrated in FIG. 21. In FIG. 21, the composition K1 is a composition as a “full shot” (whole-body composition) in which the combination of the parts of the subject appearing in the captured image is a combination of the “eyes, ears, a nose, a mouth, a neck, shoulders, elbows, wrists, buttocks, knees, and ankles”. Furthermore, the composition K2 is a composition as a “knee shot” (composition of the knees and above) in which the combination of the parts of the subject shown in the captured image is a combination of “eyes, ears, nose, mouth, neck, shoulder, elbows, wrists, buttocks, and knees” in which only “ankles” are removed from the composition K1, and the composition K3 is a composition as a “bust shot” (composition of the half body) in which the combination of the parts of the subject shown in the captured image is a combination of the “eyes, ears, a nose, a mouth, a neck, shoulders, elbows” in which the “knees, buttocks, and wrists” are further removed from the composition K2.

FIG. 22 illustrates an example of the captured image corresponding to each of the compositions K1, K2, and K3, in which FIG. 22A corresponds to the composition K1 (full shot), FIG. 22B corresponds to the composition K2 (knee shot), and FIG. 22C corresponds to the composition K3 (bust shot).

In the first example, these compositions K1, K2, and K3 are switched according to a touch operation on the screen 10*a*. Specifically, in a state where the detected subject as a person is displayed on the screen 10*a*, the control unit 8 in this case switches the compositions K1, K2, and K3 according to the tap operation on the detected subject on the screen 10*a* after the detected subject is arranged at the center of the screen 10*a* by the above-described double tap operation. More specifically, the control unit 8 in this case switches the composition in a toggling manner as composition K1→composition K2→composition K3→composition K1→ . . . every time the tap operation is performed on the detected subject after the double tap operation.

Note that the switching of the composition K is not limited to the example performed according to the tap operation after the double tap operation as described above, and can be performed according to, for example, a zoom operation or the like after the tracking target subject is designated by the touch operation of the first finger.

FIG. 23 is a flowchart illustrating an example of a specific processing procedure for achieving the composition adjustment method as the first example as described above.

Note that the control unit 8 in this case also executes the processing illustrated in FIG. 13 as in the case of the first embodiment. However, the control unit 8 in this case executes the processing illustrated in FIG. 23 instead of the processing illustrated in FIG. 15 as the subject tracking mode processing in step S107.

The processing illustrated in FIG. 23 is different from the processing illustrated in FIG. 15 in that composition switching processing based on the simplified model information in step S501 is executed after the processing in step S309 is executed.

FIG. 24 is a flowchart illustrating the composition switching processing based on the simplified model information in step S501.

First, in step S510, the control unit 8 resets a tap number identification value c to zero. The tap number identification value c is a value for identifying the number of taps after the double tap operation, and every time the re-tapping on the tapped subject is detected in step S511, the value is updated in a toggling manner as c=0→1→2→0→ . . . by the processing in steps S516 and S521.

In step S511 following step S510, the control unit 8 determines whether or not the tapped subject has been re-tapped. The tapped subject means the detected subject designated by the touch operation detected in step S101. In step S511, it is determined whether or not an operation of tapping within the range of the tapped subject has been performed.

Describing for confirmation, at the time when the composition switching processing in step S501 is started, a touch for positioning the detected subject at the center of the screen has already been performed (see steps S210, S305 to S308 in FIG. 23). In step S511, the expression "re-tap" is used to determine the presence or absence of a tap operation on the detected subject from this state.

In a case where it is determined that the tapped subject has not been re-tapped, the control unit 8 proceeds to step S512 and determines whether or not an area other than the tapped subject has been touched, and in a case where it is determined that an area other than the touched subject has not been touched, the control unit 8 returns to step S511. That is, the control unit 8 waits for either a re-tap of the tapped subject or a touch of an area other than the touched subject by the processing of steps S511 and S512.

In a case where it is determined in step S512 that there is a touch of an area other than the tapped subject, the control unit 8 returns to step S102. Thus, if the touch of the area other than the tapped subject performed after the double tap operation is on the detected subject other than the tapped subject, the processing of step S107 is executed (that is, the tracking of the detected subject other than the tapped subject is switched, enabling adjustment and the like of the subject arrangement position according to the tracing operation). Alternatively, if the touch of the area other than the tapped subject performed after the double tap operation is a touch on the area other than the detected subject, the processing of step S105 is executed (that is, the subject tracking is released, enabling adjustment and the like of the imaging direction according to the tracing operation).

On the other hand, in a case where it is determined in step S511 that the tapped subject is re-tapped, the control unit 8 proceeds to step S513 and checks the tap number identification value c. If the tap number identification value c is zero, the control unit 8 proceeds to step S514 and calculates the focal length corresponding to the full shot (composition K1) as a target focal length. In other words, the target focal length is calculated so as to achieve a composition in which the combination of portions appearing in the captured image is a combination of "eyes, ears, a nose, a mouth, a neck, shoulders, elbows, wrists, buttocks, knees, and ankles" as in the composition K1 in FIG. 21 on the basis of the simplified model information acquired for the tapped subject.

Then, in step S515 following step S514, the control unit 8 sets the target position Pt of tracking to a position corresponding to the full shot.

Here, in this example, the control unit 8 uses, as the position Ps of the subject used in the tracking control processing, for example, a position of a portion that fits within the screen 10*a* when it is the composition K3 that is a composition in which the subject is zoomed in the most, such as a position of a "neck" of the subject. Thus, it is possible to prevent the position Ps of the subject from being lost and the tracking from failing at the time of switching to the composition K2 or the composition K3.

The target position Pt in step S515 is set to a position where at least the head of the subject (the upper end of the subject) does not frame out in the composition K1 with reference to the position Ps of the subject, which is set to the position of the "neck" or the like as described above.

In response to the setting of the target position Pt in step S515, the control unit 8 increments the tap number identification value c by one in step S516, performs zooming control (control of the driver of the zoom lens in the driver unit 7) so as to achieve the target focal length in step S522, and returns to step S511.

Furthermore, if the tap number identification value c is one in step S513, the control unit 8 proceeds to step S517 and calculates the focal length corresponding to the knee shot (composition K2) as the target focal length, and sets the target position Pt of tracking to the position corresponding to the knee shot in step S518. Specifically, in this example, the target position Pt is set to a position where at least the head of the subject does not frame out in the composition K2 with reference to the position Ps of the subject, which is set to the position of the "neck" or the like as described above.

Then, in response to the execution of the processing in step S518, the control unit 8 increments the tap number identification value c by one in step S516, then executes the zooming control in step S522, and returns to step S511.

Furthermore, in a case where the tap number identification value c is two in step S513, the control unit 8 proceeds to step S519 and calculates the focal length corresponding to the bust shot (composition K3) as the target focal length, and sets the target position Pt of tracking to the position corresponding to the bust shot in step S520. Specifically, in this example, the target position Pt is set to a position where at least the head of the subject does not frame out in the composition K3 with reference to the position Ps of the subject, which is set to the position of the "neck" or the like as described above.

Then, in response to the execution of the processing of step S520, the control unit 8 resets the tap number identification value c to zero in step S521, then executes the zooming control of step S522, and returns to step S511.

By the processing of steps S511 to S522 as described above, the composition K is switched in a toggling manner as composition K1→composition K2→composition K3→composition K1→ . . . every time the tap operation is performed on the tapped subject.

Note that in the above description, the composition K is switched according to the tap operation after the target detected subject is moved to the screen center by the double tap operation, but this is merely an example, and for example, the composition K can also be switched according to another operation (including operations other than the tap operation) such as switching the composition K according to the second and subsequent tap operations of the target detected subject.

Furthermore, in the above description, the example has been described in which the adjustment of the composition is achieved by the change in the imaging direction and the change in the angle of view by the control of the platform device 50, but the adjustment of the composition can be achieved by changing at least one of the imaging direction or the angle of view.

Furthermore, the posture of the subject can be detected depending on the simplified model information of the human body. In a case where the posture of the subject is detected, it is conceivable not to execute switching of the composition K when the subject is in a predetermined posture. For example, when the subject is in a squatting posture, avoiding changing of the composition K to the zoom-in side, or the like is conceivable in consideration of the possibility of rising or jumping thereafter.

3-2. Second Example

Next, a second example of the third embodiment will be described.

In the second example, the platform device 50 is controlled such that an angle-of-view center Pc is located on a front direction side of the subject on the basis of direction information of the subject estimated from the simplified model information.

Figure 25:
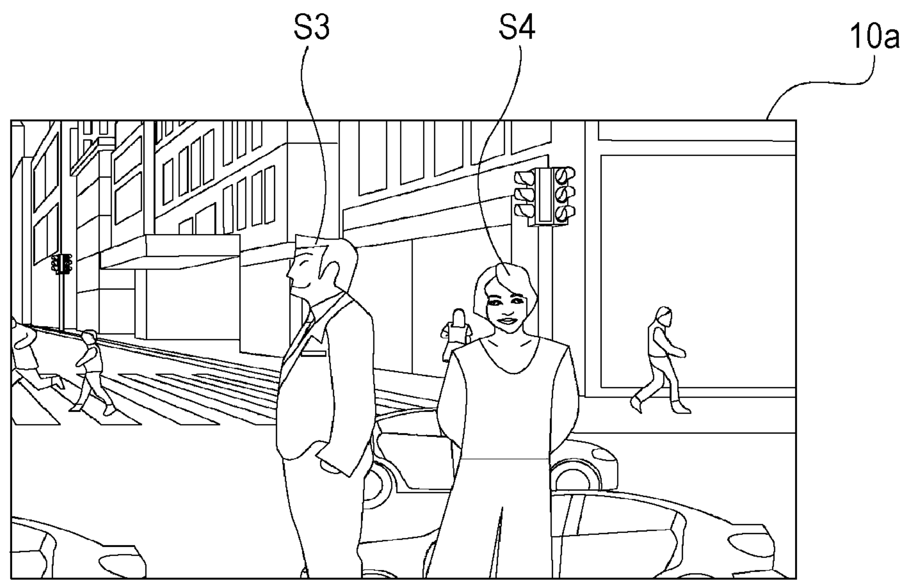
FIG. 25 is a diagram for explaining a composition adjustment method as a second example in the third embodiment.
Figure 26:
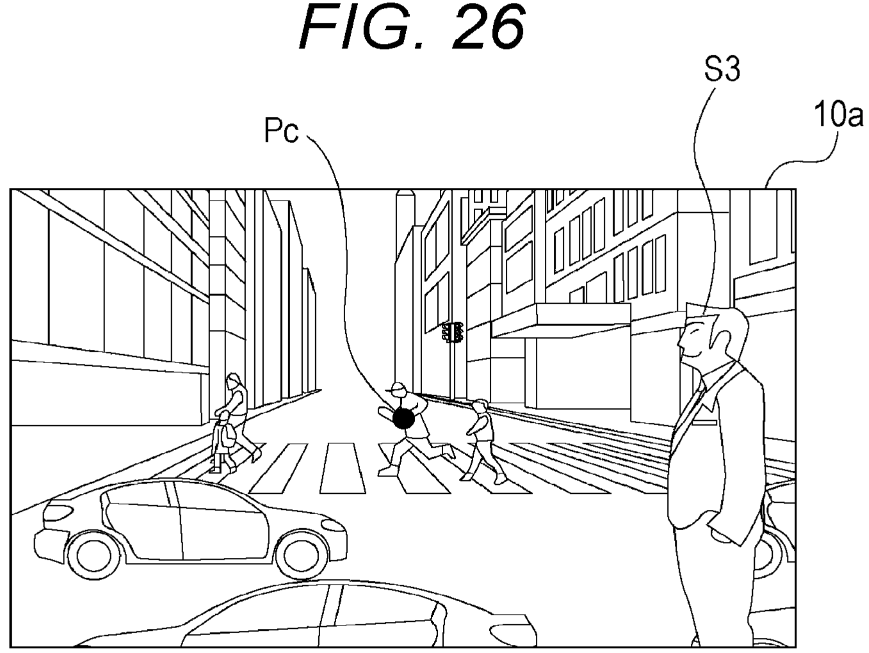
FIG. 26 is a diagram for explaining a composition adjustment method as the second example in the third embodiment together with FIG. 25.

FIGS. 25 and 26 are explanatory diagrams of a composition adjustment method as a second example.

FIG. 25 illustrates an example in which a subject S3 facing the left direction and a subject S4 facing the front are displayed in the screen 10*a*. In the second example, after the touch operation on the detected subject, the composition is adjusted such that the angle-of-view center Pc is located on the front direction side of the detected subject according to a second touch operation. In the examples of FIGS. 25 and 26, the composition is adjusted such that the angle-of-view center Pc is located on the front direction side of the subject S3 according to the second touch operation after the touch operation of the subject S3.

Figure 27:
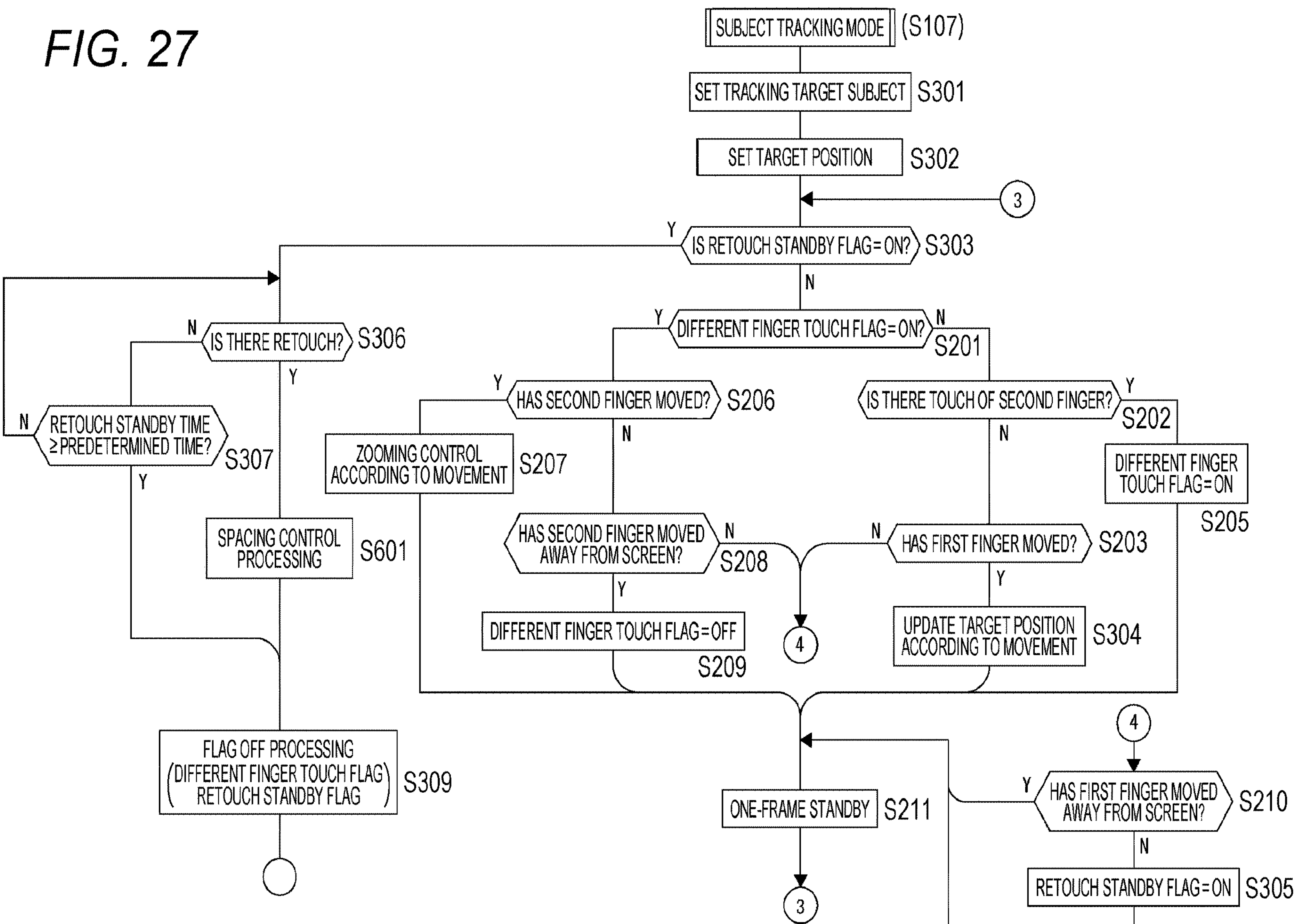
FIG. 27 is a flowchart illustrating an example of a specific processing procedure for achieving a composition adjustment method as the second example in the third embodiment.

The flowchart of FIG. 27 illustrates a specific processing procedure for achieving the composition adjustment method as the second example.

Also in this case, the control unit 8 executes the processing illustrated in FIG. 13 as in the case of the first embodiment. However, the control unit 8 in this case executes the processing illustrated in FIG. 27 instead of the processing illustrated in FIG. 15 as the subject tracking mode processing in step S107.

A difference from the processing illustrated in FIG. 15 is that spacing control processing in step S601 is executed instead of the processing in step S308.

In the spacing control processing in step S601, the control unit 8 estimates the direction of the detected subject (that is, the tracking target subject) for which the touch operation is detected in step S101 from the simplified model information acquired from the image recognition processing unit 5. Then, the target position Pt is updated such that the angle-of-view center Pc is located on the front direction side of the detected subject.

The control unit 8 advances the processing to step S309 in response to the execution of the spacing control processing in step S601.

Through the processing as described above, the composition is adjusted such that the angle-of-view center Pc is located on the front direction side of the tracking target subject in response to the touch operation on the screen 10*a* after the touch operation to designate the tracking target subject.

Since the adjustment is performed to a natural composition in which a space is secured on the front side of the designated subject in response to a simple operation of touching the screen 10*a*, the adjustment can be performed to a composition with less discomfort while reducing the operation burden on the user.

Note that in the above description, an example has been described in which the spacing control processing in step S601 is executed in response to the touch operation on the screen 10*a* after the touch operation to designate the tracking target subject, but this is merely an example, and the spacing control processing can also be executed in response to other operations (including operations other than the touch operation).

4. Modification Examples

Here, the embodiment is not limited to the specific examples exemplified above, and various modification examples are conceivable.

For example, in the above description, an example has been described in which the operation related to composition adjustment is performed as a touch operation on the screen 10*a*, but instead of this, an operation using a pointer such as a cursor displayed in the screen 10*a* can be performed. For example, the operation of designating the position of the subject or the like may be an operation of pressing a predetermined button or the like in a state where the pointer is positioned at a desired position. At this time, for example, an instruction on the displacement of the pointer in the screen 10*a* can be given with a displacement instruction control element such as a cross key. Furthermore, it is conceivable that the moving direction designation operation related to adjustment of the imaging direction, adjustment of the in-screen position of the subject, and the like is, for example, an operation of displacing the pointer by the above-described displacement instruction control element in a state where a predetermined button is pressed.

Furthermore, in the above description, an example has been described in which the imaging device that captures an image displayed on the screen 10*a* and the imaging device that performs image-capturing for performing image recognition such as subject detection are the common imaging device 1, but these imaging devices may be separate devices.

Figure 28:
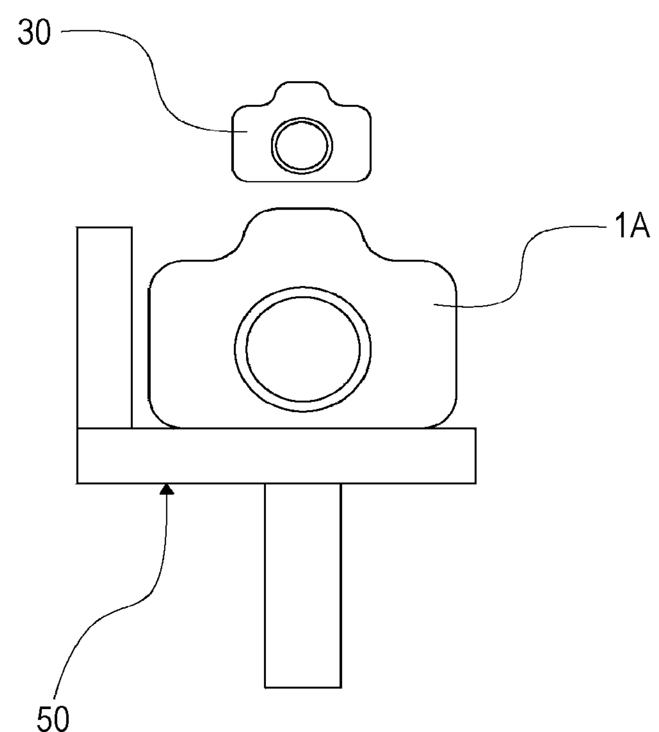
FIG. 28 is a diagram illustrating a configuration of an imaging system as a modification example.

FIG. 28 illustrates an example thereof.

In this case, an imaging device 1A corresponds to an imaging device that captures an image displayed on the screen 10*a*, and the imaging device 30 corresponds to an imaging device that performs image-capturing to perform image recognition. The imaging device 30 is, in other words, an imaging device separate from the imaging device 1A that captures the image displayed on the screen 10*a*.

As illustrated, the imaging device 30 and the imaging device 1A are mounted on the common platform device 50, and the imaging device 30 and the imaging device 1A move in conjunction in the pan direction and the tilt direction according to a pan and tilt operation of the platform device 50.

Figure 29:
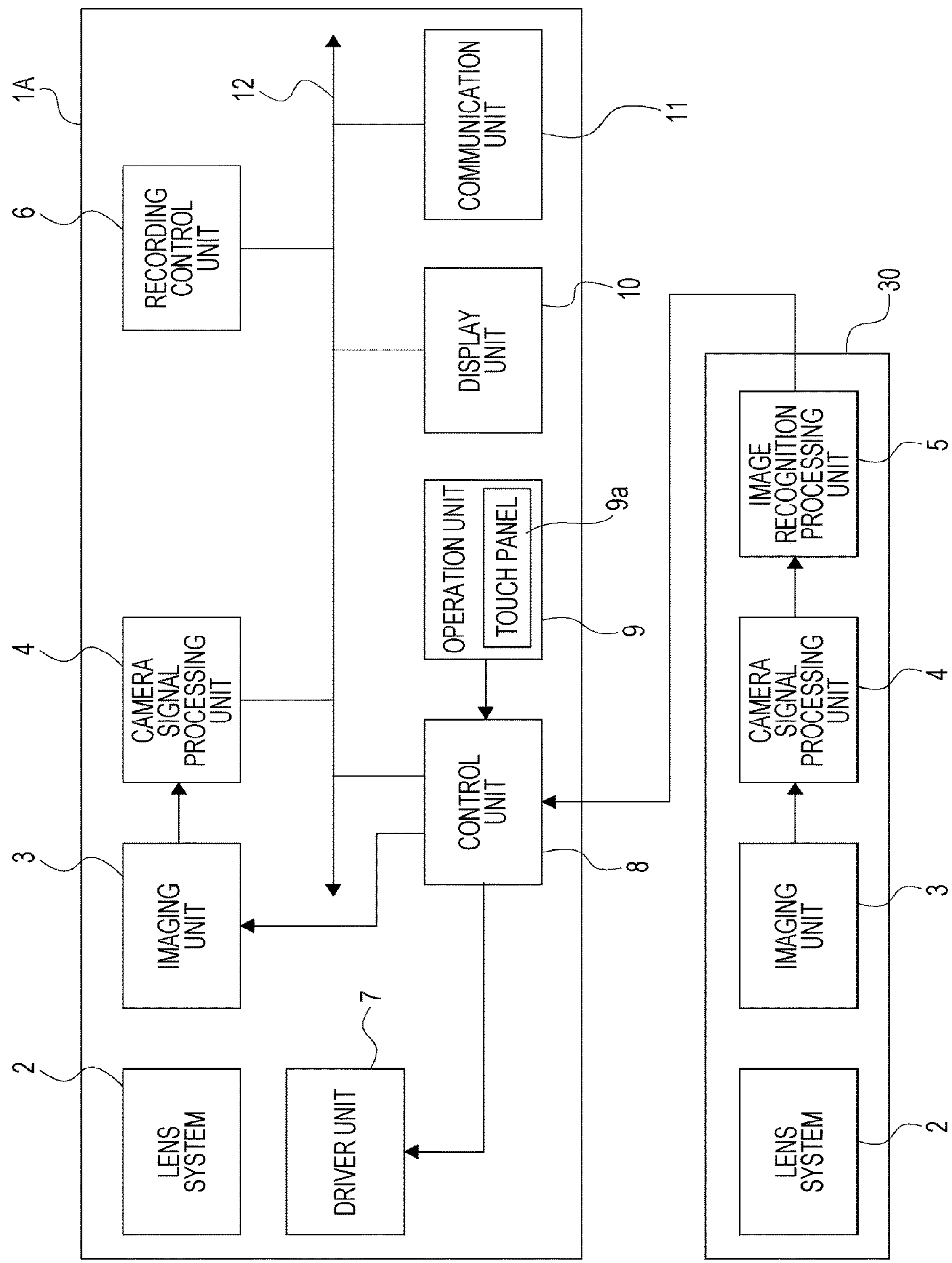
FIG. 29 is a block diagram illustrating an internal configuration example of each imaging device in a modification example.

FIG. 29 is a block diagram illustrating an internal configuration example of the imaging device 30 and the imaging device 1A.

The imaging device 30 includes a lens system 2, an imaging unit 3, a camera signal processing unit 4, and an image recognition processing unit 5. Note that these units have already been described, and thus redundant description will be avoided.

The imaging device 1A is different from the imaging device 1 in that the image recognition processing unit 5 is omitted.

In this case, the control unit 8 in the imaging device 1A executes processing (processing in FIGS. 13 to 15, 16, 17, 19, 23, 24, 27, and the like) for composition adjustment similar to that of the first, second, or third embodiment, including the subject tracking control processing, on the basis of the subject information Is acquired from the image recognition processing unit 5 of the imaging device 30.

Note that in the imaging system having the configuration described above, a parallax or a difference in angle of view occurs between the imaging device 30 and the imaging device 1A, and thus the subject position is aligned between the captured images on the basis of the parallax or the difference in angle of view.

By employing the configuration of the imaging system as described above, the camera setting of the imaging device 1A can be a camera setting intended for drawing, and the camera setting of the imaging device 30 can be a camera setting suitable for image recognition. For example, when panning of a subject is performed, the imaging device 1A performs imaging by reducing the shutter speed and setting appropriate exposure, but the imaging device 30 can be set to a camera setting different from this. That is, it is possible to robustly recognize a subject moving at a high speed in a state where the shutter speed is increased and the ISO sensitivity is increased.

Furthermore, the angle of view of the imaging device 30 is not affected by the angle of view of the imaging device 1A, by making the angle of view of the imaging device 30 wider than the angle of view of the imaging device 1A, the tracking target subject is less likely to be framed out, and the robustness of subject recognition can be increased.

Moreover, by increasing the frame rate of the imaging device 30 as compared with the imaging device 1, the tracking performance of the subject can be increased.

Figure 30:
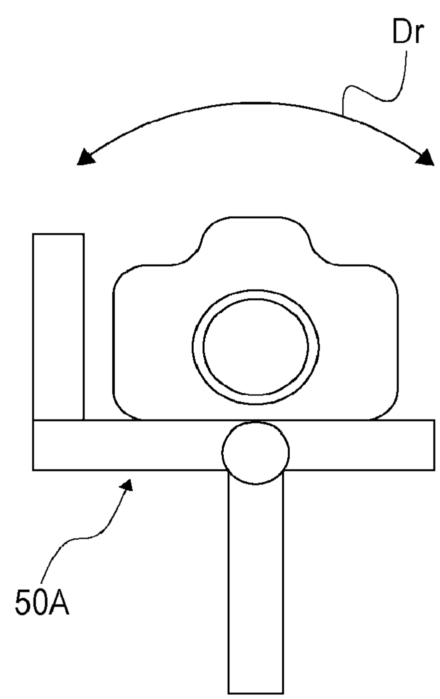
FIG. 30 is a diagram exemplifying a platform device that can be driven in a roll direction.

Furthermore, in the above description, the platform device capable of driving only in the pan direction and the tilt direction has been exemplified as the platform device 50, but a platform device capable of driving in a roll direction (direction of arrow Dr in the drawings) like a platform device 50A exemplified in FIG. 30 can also be used.

In a case where the driving in the roll direction is enabled in this manner, it is conceivable to adjust the direction of the imaging device 1 in the roll direction according to the tracing operation on the screen 10*a*.

Figure 31:
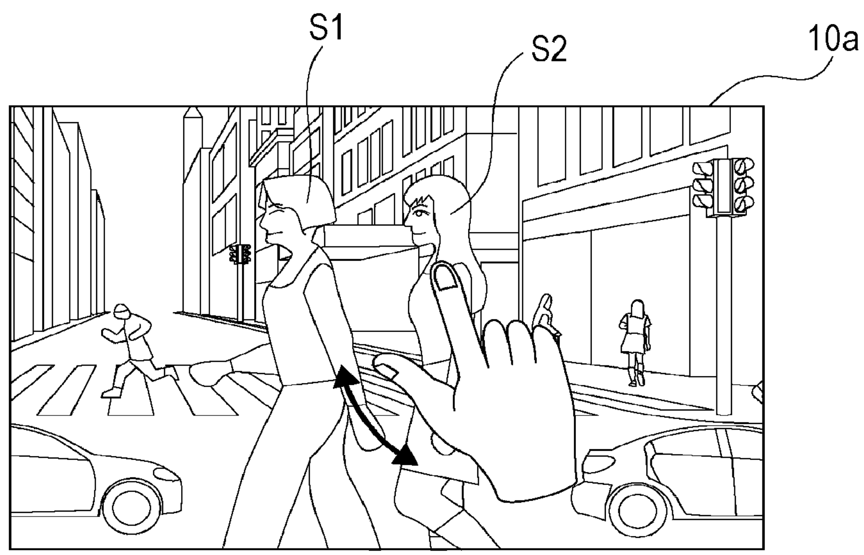
FIG. 31 is a diagram for explaining a modification example in which a direction of the imaging device in the roll direction is changed.

For example, FIG. 31 illustrates that an operation of touching the subject S2 with the first finger (an operation of designating a tracking target subject) is performed, and then an operation of tracing the screen 10*a* in an arc shape with the second finger is performed. In response to such an operation, as illustrated in FIG. 32, the control unit 8 controls the platform device 50 such that the direction of the imaging device 1 in the roll direction changes by an amount corresponding to the amount traced in the traced direction.

Here, in this case, in order to be distinguishable from the direction change instruction operation in the roll direction, the direction change instruction operation in the pan direction and the tilt direction is an operation of linearly tracing the second finger.

Figure 32:
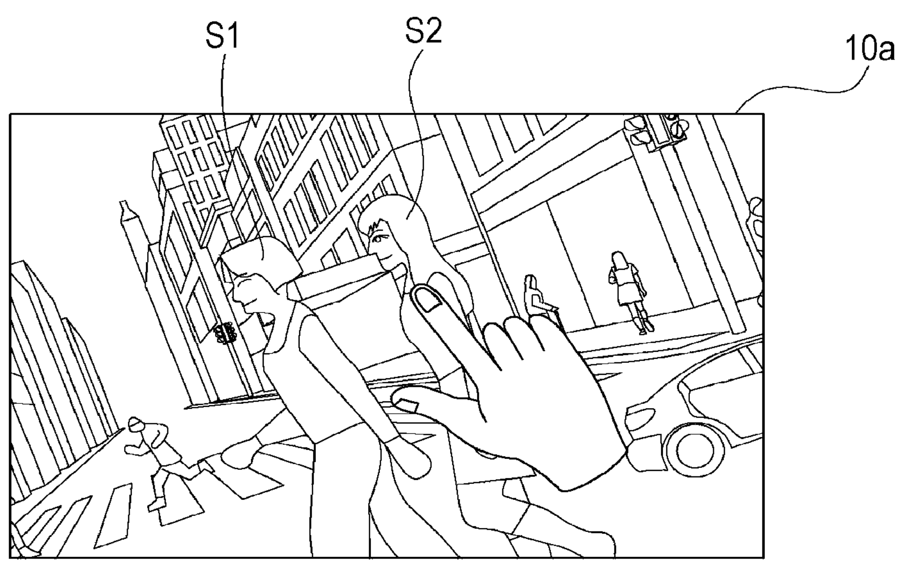
FIG. 32 is a diagram for explaining a modification example in which the direction of the imaging device in the roll direction is changed together with FIG. 31.

Note that in FIGS. 31 and 32, although the example has been described in which the direction of the imaging device 1 in the roll direction is adjusted according to the tracing operation by the second finger after the first finger touches the detected subject, such adjustment of the direction in the roll direction is similarly performed even in a case where the first finger touches a subject other than the detected subject.

Furthermore, in a case where the simplified model information of the subject is available as in the third embodiment, in response to detection that the target subject appears obliquely from the simplified model information, the direction in the roll direction can be adjusted such that the target subject is in an upright state in the screen 10*a* (or in order to reduce the inclination).

5. Summary of Embodiment

As described above, the composition control device (Imaging device 1, 1A) as an embodiment includes a control unit (8) configured to acquire composition designation operation information that is operation information designating a composition of an imaging device and includes information of a designated position on a screen (10*a*) that displays a captured image of the imaging device, and control an imaging range of the imaging device to adjust the composition of the imaging device on the basis of subject information corresponding to the designated position of the composition designation operation information.

The composition designation operation information includes information of the designated position on the screen on which the captured image is displayed. Thus, adjustment to a target composition is performed on the basis of an intuitive operation of designating a position on the screen for displaying the captured image. Specifically, in the configuration described above, the composition of the imaging device is adjusted on the basis of the subject information corresponding to the designated position on the screen. The subject information is information regarding a subject in the captured image, and is at least information indicating the presence or absence of the detected subject. Thus, the composition is adjusted on the basis of an intuitive operation such as an operation of designating the position of the detected subject on the screen.

Therefore, operability can be improved for an operation related to the composition adjustment.

Furthermore, in the composition control device as the embodiment, in a case where the subject information indicates a detected subject detected from the captured image, the control unit controls the imaging range in such a manner as to track the detected subject.

Thus, an operation of designating the subject to be tracked is an operation of designating the detected subject in the screen.

Therefore, operability can be improved for the operation related to the composition adjustment.

Moreover, in the composition control device as the embodiment, in a case where the subject information does not indicate the detected subject, the control unit does not perform control for tracking the subject at the designated position.

Thus, for example, in a case where a subject estimated as not desired by the user to be tracked, such as a background portion of the detected subject, is designated, tracking of the subject at the designated position is not performed.

Therefore, it is possible to achieve appropriate tracking control according to an intention of the user.

Furthermore, in the composition control device as the embodiment, the composition designation operation information includes direction designation operation information based on a direction designation operation that designates a direction in a plane of the screen, and the control unit controls the imaging range on the basis of the direction designation operation information.

With this direction designation operation, it is possible to designate a direction related to the composition adjustment such as a direction of changing a position of the subject designated by an operation of designating a position in the screen.

An operation of designating a direction related to the composition adjustment is achieved by an intuitive operation on the screen, and operability can be improved for the operation related to the composition adjustment.

Furthermore, in the composition control device as the embodiment, the composition designation operation information is detected by a touch operation on the screen, and the designated position is a touch start position of the screen.

Thus, an operation of designating the subject to be tracked can be a simple operation of touching the subject on the screen.

Therefore, operability can be improved for the operation related to the composition adjustment.

Moreover, in the composition control device as the embodiment, the direction designation operation information is detected by an operation of tracing the screen.

Thus, the operation of designating a direction related to the composition adjustment can be achieved by an intuitive operation of sliding a finger in a direction in which the composition is desired to be changed on the screen.

Therefore, operability can be improved for the operation related to the composition adjustment.

Furthermore, in a case where the operation of designating the position is a touch operation and the tracking target subject is designated by the operation of designating the position, designation of the tracking target subject and designation of movement of the position of the designated subject in the screen can be performed by an operation of tracing the screen in an arbitrary direction with the touched finger.

Therefore, ease of operation is increased, and operability can be further improved.

Furthermore, in the composition control device as the embodiment, the control unit controls the imaging range by controlling a platform device (50, 50A) to which the imaging device is attached.

Thus, it is possible to adjust the composition by changing the imaging direction of the imaging device by the platform device.

Therefore, the degree of freedom of the composition adjustment can be increased.

Furthermore, in the composition control device as the embodiment, the platform device is capable of adjusting a direction of the imaging device in a pan or tilt direction, and the composition designation operation information designating the pan or tilt direction is detected by an operation of linearly tracing the screen.

Thus, the operation of designating the pan or tilt direction is achieved by an intuitive operation of linearly sliding the finger along the pan or tilt direction.

Therefore, operability can be improved for the operation related to the composition adjustment.

Furthermore, in the composition control device as the embodiment, the platform device is capable of adjusting a direction of the imaging device in a roll direction, and the composition designation operation information designating the roll direction is an operation of tracing the screen in an arc shape.

Thus, an operation of designating the roll direction is achieved by an intuitive operation of sliding the finger in an arc shape along the roll direction.

Therefore, operability can be improved for the operation related to the composition adjustment.

Moreover, in the composition control device as the embodiment, the control unit controls the imaging range by controlling a platform device to which the imaging device is attached, and controls the platform device to change a direction of the imaging device in a direction opposite to the direction designated by the direction designation operation in a case where the subject information indicates a detected subject detected from the captured image, and to change the direction of the imaging device in the direction designated by the direction designation operation in a case where the subject information does not indicate the detected subject.

In a case where a position designation operation is an operation of designating the position of the detected subject, it can be estimated that the user desires to change the position of the detected subject in the screen by a subsequent direction designation operation, and thus the direction of the imaging device is changed in the direction opposite to the direction designated by the direction designation operation. On the other hand, in a case where the position designation operation is an operation of designating a position other than the detected subject, it can be estimated that the user directly designates a changing direction of the imaging direction by the subsequent direction designation operation, and thus the direction of the imaging device is changed in the direction designated by the direction designation operation.

Thus, it is possible to achieve appropriate composition adjustment reflecting an intention of the user.

Furthermore, in the composition control device as the embodiment, the control unit controls the imaging range by controlling a platform device to which the imaging device is attached, and controls, in a case where the subject information indicates the detected subject, the platform device using a parameter corresponding to a type of the detected subject as a parameter related to the tracking.

Thus, it is possible to perform tracking control by a parameter corresponding to the designated subject, such as performing tracking control by a parameter with increased followability in a case where the designated subject is a type of subject that moves quickly and performing tracking control by a parameter with decreased followability in a case where the designated subject is a type of subject that moves slowly.

Therefore, accuracy of the tracking control can be improved.

Furthermore, in the composition control device as the embodiment, the platform device is capable of adjusting directions of the imaging device in a pan direction and a tilt direction, and the control unit uses the parameter corresponding to the type of the detected subject for each of control in the pan direction and control in the tilt direction of the platform device.

Thus, tracking characteristics in the pan direction and the tilt direction can be individually set according to the type of the designated subject. It is possible that, for example, in a case where the subject is a bird, tracking responsiveness is increased in both the pan and tilt directions, and in a case where the subject is a dog, the tracking responsiveness in the pan direction is enhanced but the tracking responsiveness in the tilt direction is lowered.

It is possible to prevent tracking with excessively increased responsiveness from being performed in a direction in which the tracking responsiveness does not need to be increased according to the type of subject, and to improve stability of the tracking control.

Moreover, in the composition control device as the embodiment, the control unit performs tracking control in one of a first tracking mode in which the parameter (the first parameter described above) having high tracking responsiveness in the pan direction and the tilt direction is used, a second tracking mode in which the parameter (the second parameter described above) having low tracking responsiveness in the pan direction and the tilt direction is used, and a third tracking mode in which the parameter (the third parameter described above) having low tracking responsiveness in one of the pan direction and the tilt direction and having high tracking responsiveness in the other of the pan direction and the tilt direction according to the type of the detected subject.

Thus, it is possible to prevent tracking in which responsiveness is excessively enhanced in a direction in which it is not necessary to enhance the tracking responsiveness according to the type of the designated subject.

Therefore, the stability of the tracking control can be improved.

Furthermore, in the composition control device as the embodiment, the control unit adjusts, after control of the platform device using the parameter corresponding to the type of the detected subject is started, the parameter on the basis of an error between a position of the detected subject and a target position of tracking.

It is possible to determine whether or not the set parameter is suitable for actual movement of the subject according to the magnitude of the error between a designated position of the subject and the target position of tracking.

Therefore, by adjusting the parameter on the basis of the error, the parameter can be adjusted to a parameter suitable for actual movement of the subject, and the stability of the tracking control can be improved.

Furthermore, in the composition control device as the embodiment, the control unit controls, in a case where the subject information indicates a detected subject detected as a person in the screen, the imaging range on the basis of simplified model information of a human body detected for the detected subject.

The simplified model information of the human body is information indicating an arrangement state of a plurality of parts constituting the human body such as eyes, ears, a nose, a mouth, a neck, shoulders, elbows, wrists, buttocks, knees, and ankles in the human body. With the above configuration, the control of the imaging range for changing the composition can be performed not on the basis of the operation of directly instructing the driving direction or the drive amount of the camera platform or the focal length adjustment operation, but on the basis of a position and posture of each part of the subject, for example, estimated from the simplified model information described above.

Therefore, it is possible to reduce the operation burden on the user related to the composition adjustment.

Furthermore, by using the simplified model information, estimation accuracy of a specific portion such as the whole body part or a half body part of the subject to be contained in the screen (in the captured image) is increased, and thus precision of the composition adjustment can be improved. For example, although a specific portion such as the whole body or a half body of the subject can be estimated from a face portion detected by face detection, the estimation accuracy of the specific portion is higher than that in that case, and the precision of the composition adjustment can be improved.

Furthermore, in the composition control device as the embodiment, the control unit controls the imaging range in such a manner that a center of an angle of view is located on a front direction side of the detected subject on the basis of information of a direction of the detected subject estimated from the simplified model information.

Thus, it is possible to adjust the composition to a natural composition in which a space is secured on a front side of the designated subject.

Therefore, it is possible to adjust the composition with less discomfort while reducing the operation burden on the user.

Furthermore, in the composition control device as the embodiment, the composition designation operation information is detected by a touch operation on the screen, the designated position is a touch start position of the screen, and the control unit controls the imaging range based on the simplified model information on the basis of an operation on the screen after detection of the designated position.

Thus, the composition adjustment based on the simplified model information, such as adjustment to a composition in which the entire body of the subject appears or a composition in which only a half body appears for example, can be achieved by a simple operation of designating a target subject by a touch operation on the screen and then performing an operation on the screen.

Therefore, an operation related to the composition adjustment can be facilitated, and the operation burden on the user can be reduced.

Moreover, in the composition control device as the embodiment, the control unit controls the imaging range on the basis of a result of image recognition processing performed on a captured image by an imaging device (the same 30) separate from the imaging device (identical 1, 1A) in which a captured image is displayed on the screen.

Thus, as a captured image used for the image recognition processing, a captured image with camera settings suitable for the image recognition processing can be used instead of the captured image with camera settings according to a drawing intention of the user.

Therefore, in a case where imaging range control for the composition adjustment is performed on the basis of the result of the image recognition processing, accuracy of the image recognition processing can be improved, and accuracy of the composition adjustment can be improved.

Furthermore, a composition control method as an embodiment is a composition control method including acquiring composition designation operation information that is operation information designating a composition of an imaging device and includes information of a designated position on a screen that displays a captured image of the imaging device, and controlling an imaging range of the imaging device to adjust the composition of the imaging device on the basis of subject information corresponding to the designated position of the composition designation operation information.

Even with such a composition control method as an embodiment, a similar operation and effect to those of the composition control device as the embodiment described above can be obtained.

A program according to an embodiment is a program causing an information processing device to achieve a function including acquiring composition designation operation information that is operation information designating a composition of an imaging device and includes information of a designated position on a screen that displays a captured image of the imaging device, and controlling an imaging range of the imaging device to adjust the composition of the imaging device on the basis of subject information corresponding to the designated position of the composition designation operation information.

That is, the program causes the information processing device to execute the processing described in FIGS. 13 to 15, 16, 17, 19, 23, 24, 27, and the like.

With such a program, it is easy to achieve the composition control device as the embodiment.

Then, such a program can be stored in advance in a recording medium built in a device such as a computer device, a ROM in a microcomputer having a CPU, or the like. Alternatively, the program can be temporarily or permanently stored in a removable recording medium such as a semiconductor memory, a memory card, an optical disk, a magneto-optical disk, or a magnetic disk. Such a removable recording medium can also be provided as what is called package software.

Furthermore, such a program can be installed from the removable recording medium into a personal computer or the like, or can be downloaded from a download site via a network such as a local area network (LAN) or the Internet.

Note that effects described in the present description are merely examples and are not limited, and other effects may be provided.

6. Present Technology

Note that the present technology can employ configurations as follows.

(1)

A composition control device including:

a control unit configured to acquire composition designation operation information that is operation information designating a composition of an imaging device and includes information of a designated position on a screen that displays a captured image of the imaging device, and control an imaging range of the imaging device to adjust the composition of the imaging device on the basis of subject information corresponding to the designated position of the composition designation operation information.

(2)

The composition control device according to (1) above, in which in a case where the subject information indicates a detected subject detected from the captured image, the control unit controls the imaging range in such a manner as to track the detected subject.

(3)

The composition control device according to (2) above, in which in a case where the subject information does not indicate the detected subject, the control unit does not perform control for tracking the subject at the designated position.

(4)

The composition control device according to any one of (1) to (3) above, in which the composition designation operation information includes direction designation operation information based on a direction designation operation that designates a direction in a plane of the screen, and the control unit controls the imaging range on the basis of the direction designation operation information.

(5)

The composition control device according to any one of (2) to (4) above, in which the composition designation operation information is detected by a touch operation on the screen, and the designated position is a touch start position of the screen.

(6)

The composition control device according to (4) above, in which the direction designation operation information is detected by an operation of tracing the screen.

(7)

The composition control device according to any one of (1) to (6) above, in which the control unit controls the imaging range by controlling a platform device to which the imaging device is attached.

(8)

The composition control device according to (7) above, in which the platform device is capable of adjusting a direction of the imaging device in a pan or tilt direction, and the composition designation operation information designating the pan or tilt direction is detected by an operation of linearly tracing the screen.

(9)

The composition control device according to (7) or (8) above, in which the platform device is capable of adjusting a direction of the imaging device in a roll direction, and the composition designation operation information designating the roll direction is an operation of tracing the screen in an arc shape.

(10)

The composition control device according to any one of (4) to (9) above, in which the control unit controls the imaging range by controlling a platform device to which the imaging device is attached, and controls the platform device to change a direction of the imaging device in a direction opposite to the direction designated by the direction designation operation in a case where the subject information indicates a detected subject detected from the captured image, and to change the direction of the imaging device in the direction designated by the direction designation operation in a case where the subject information does not indicate the detected subject.

(11)

The composition control device according to any one of (2) to (10) above, in which the control unit controls the imaging range by controlling a platform device to which the imaging device is attached, and controls, in a case where the subject information indicates the detected subject, the platform device using a parameter corresponding to a type of the detected subject as a parameter related to the tracking.

(12)

The composition control device according to (11) above, in which the platform device is capable of adjusting directions of the imaging device in a pan direction and a tilt direction, and the control unit uses the parameter corresponding to the type of the detected subject for each of control in the pan direction and control in the tilt direction of the platform device.

(13)

The composition control device according to (12) above, in which the control unit performs tracking control in one of a first tracking mode in which the parameter having high tracking responsiveness in the pan direction and the tilt direction is used, a second tracking mode in which the parameter having low tracking responsiveness in the pan direction and the tilt direction is used, and a third tracking mode in which the parameter having low tracking responsiveness in one of the pan direction and the tilt direction and having high tracking responsiveness in the other of the pan direction and the tilt direction according to the type of the detected subject.

(14)

The composition control device according to any one of (11) to (13) above, in which the control unit adjusts, after control of the platform device using the parameter corresponding to the type of the detected subject is started, the parameter on the basis of an error between a position of the detected subject and a target position of tracking.

(15)

The composition control device according to any one of (1) to (14) above, in which the control unit controls, in a case where the subject information indicates a detected subject detected as a person in the screen, the imaging range on the basis of simplified model information of a human body detected for the detected subject.

(16)

The composition control device according to (15) above, in which the control unit controls the imaging range in such a manner that a center of an angle of view is located on a front direction side of the detected subject on the basis of information of a direction of the detected subject estimated from the simplified model information.

(17)

The composition control device according to (15) or (16) above, in which the composition designation operation information is detected by a touch operation on the screen, the designated position is a touch start position of the screen, and the control unit controls the imaging range based on the simplified model information on the basis of an operation on the screen after detection of the designated position.

(18)

The composition control device according to any one of (1) to (17) above, in which the control unit controls the imaging range on the basis of a result of image recognition processing performed on a captured image by an imaging device separate from the imaging device in which a captured image is displayed on the screen.

REFERENCE SIGNS LIST

1, 1A Imaging device
5 Image recognition processing unit
7 Driver unit
8 Control unit
9 Operation unit
9*a* Touch panel
10 Display unit
10*a* Screen
30 Imaging device
50, 50A Platform device
56 Actuator
57 Drive control unit
F1 Position error calculation processing unit
F2 Control value calculation processing unit
F3 Drive amount conversion processing unit
Pt Target position
d Error (position error)

The invention claimed is:

1. A composition control device, comprising:

control circuitry configured to acquire composition designation operation information that is operation information designating a composition of an imaging device and includes information of a designated position on a screen that displays a captured image captured by the imaging device, wherein the acquired composition designation operation information includes direction designation operation information based on a direction designation operation that designates a direction in a plane of the screen, and control an imaging range of the imaging device to adjust the composition of the imaging device based on subject information corresponding to the designated position of the composition designation operation information, wherein the control circuitry is further configured to control the imaging range by controlling a platform device to which the imaging device is attached, and control the platform device to change a direction of the imaging device in a direction opposite to the direction designated by the direction designation operation when the subject information indicates a detected subject detected from the captured image.

2. The composition control device according to claim 1, wherein when the subject information indicates a detected subject detected from the captured image, the control circuitry is further configured to control the imaging range in such a manner as to track the detected subject.

3. The composition control device according to claim 2, wherein when the subject information does not indicate the detected subject, the control circuitry is further configured to not perform control for tracking the subject at the designated position.

4. The composition control device according to claim 1, wherein the control circuitry is further configured to control the imaging range based on the direction designation operation information.

5. The composition control device according to claim 2, wherein the composition designation operation information is detected by a touch operation on the screen, and the designated position is a touch start position of the screen.

6. The composition control device according to claim 4, wherein the direction designation operation information is detected by an operation of tracing the screen.

7. The composition control device according to claim 1, wherein the control circuitry is further configured to control the imaging range by controlling a platform device to which the imaging device is attached.

8. The composition control device according to claim 7, wherein the platform device is configured to adjust a direction of the imaging device in a pan or tilt direction, and the composition designation operation information designating the pan or tilt direction is detected by an operation of linearly tracing the screen.

9. The composition control device according to claim 7, wherein the platform device is configured to adjust a direction of the imaging device in a roll direction, and the composition designation operation information designating the roll direction is an operation of tracing the screen in an arc shape.

10. The composition control device according to claim 4, wherein the control circuitry is further configured to change the direction of the imaging device in the direction designated by the direction designation operation when the subject information does not indicate the detected subject.

11. The composition control device according to claim 2, wherein the control circuitry is further configured to control the imaging range by controlling the platform device to which the imaging device is attached, and control, when the subject information indicates the detected subject, the platform device using a parameter corresponding to a type of the detected subject as a parameter related to the tracking.

12. The composition control device according to claim 11, wherein the platform device is configured to adjust directions of the imaging device in a pan direction and a tilt direction, and the control circuitry is further configured to use the parameter corresponding to the type of the detected subject for each of control in the pan direction and control in the tilt direction of the platform device.

13. The composition control device according to claim 12, wherein the control circuitry is further configured to perform tracking control in one of a first tracking mode in which the parameter having high tracking responsiveness in the pan direction and the tilt direction is used, a second tracking mode in which the parameter having low tracking responsiveness in the pan direction and the tilt direction is used, and a third tracking mode in which the parameter having low tracking responsiveness in one of the pan direction and the tilt direction and having high tracking responsiveness in the other of the pan direction and the tilt direction according to the type of the detected subject.

14. The composition control device according to claim 11, wherein the control circuitry is further configured to adjust, after control of the platform device using the parameter corresponding to the type of the detected subject is started, the parameter based on an error between a position of the detected subject and a target position of tracking.

15. The composition control device according to claim 1, wherein the control circuitry is further configured to control, when the subject information indicates a detected subject detected as a person in the screen, the imaging range based on simplified model information of a human body detected for the detected subject.

16. The composition control device according to claim 15, wherein the control circuitry is further configured to control the imaging range in such a manner that a center of an angle of view is located on a front direction side of the detected subject based on information of a direction of the detected subject estimated from the simplified model information.

17. The composition control device according to claim 15, wherein the composition designation operation information is detected by a touch operation on the screen, the designated position is a touch start position of the screen, and the control circuitry is further configured to control the imaging range based on the simplified model information based on an operation on the screen after detection of the designated position.

18. The composition control device according to claim 1, wherein the control circuitry is further configured to control the imaging range based on a result of image recognition processing performed on a captured image captured by an imaging device separate from the imaging device in which the captured image is displayed on the screen.

19. A composition control method, comprising:

acquiring composition designation operation information that is operation information designating a composition of an imaging device and includes information of a designated position on a screen that displays a captured image of the imaging device, wherein the acquired composition designation operation information includes direction designation operation information based on a direction designation operation that designates a direction in a plane of the screen, and controlling an imaging range of the imaging device to adjust the composition of the imaging device based on subject information corresponding to the designated position of the composition designation operation information, wherein the method further comprises controlling the imaging range by controlling a platform device to which the imaging device is attached, and controlling the platform device to change a direction of the imaging device in a direction opposite to the direction designated by the direction designation operation when the subject information indicates a detected subject detected from the captured image.

20. A non-transitory computer-readable medium storing a program that when executed by an information processing device, causes the information processing device to perform a method comprising:

acquiring composition designation operation information that is operation information designating a composition of an imaging device and includes information of a designated position on a screen that displays a captured image of the imaging device, wherein the acquired composition designation operation information includes direction designation operation information based on a direction designation operation that designates a direction in a plane of the screen, and controlling an imaging range of the imaging device to adjust the composition of the imaging device based on subject information corresponding to the designated position of the composition designation operation information, wherein the method further comprises controlling the imaging range by controlling a platform device to which the imaging device is attached, and controlling the platform device to change a direction of the imaging device in a direction opposite to the direction designated by the direction designation operation when the subject information indicates a detected subject detected from the captured image.

* * * * *